United States Patent
Lee et al.

(10) Patent No.: US 11,490,407 B2
(45) Date of Patent: Nov. 1, 2022

(54) METHOD AND DEVICE FOR DETERMINING RSRP IN NR V2X

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/518,271

(22) Filed: Nov. 3, 2021

(65) Prior Publication Data

US 2022/0061079 A1 Feb. 24, 2022

Related U.S. Application Data

(63) Continuation of application No. PCT/KR2020/005916, filed on May 4, 2020.

(60) Provisional application No. 62/843,355, filed on May 3, 2019, provisional application No. 62/843,353, filed on May 3, 2019.

(51) Int. Cl.
*H04W 4/00* (2018.01)
*H04W 72/12* (2009.01)
*H04L 5/00* (2006.01)
*H04W 4/40* (2018.01)

(52) U.S. Cl.
CPC ....... *H04W 72/1278* (2013.01); *H04L 5/0048* (2013.01); *H04W 4/40* (2018.02)

(58) Field of Classification Search
CPC .... H04W 72/1278; H04W 4/40; H04L 5/0048

USPC ......................................................... 370/329
See application file for complete search history.

(56) References Cited

U.S. PATENT DOCUMENTS

| | | | |
|---|---|---|---|
| 2015/0036612 A1 | 2/2015 | Kim et al. | |
| 2017/0118720 A1 | 4/2017 | Liu | |
| 2017/0214505 A1* | 7/2017 | Zhang | H04L 1/0041 |
| 2018/0083680 A1* | 3/2018 | Guo | H04L 5/0048 |
| 2018/0176805 A1 | 6/2018 | Lee et al. | |
| 2020/0383114 A1* | 12/2020 | Zhang | H04L 5/0096 |

OTHER PUBLICATIONS

Samsung (R1-1702274, "On Physical Layer Procedures for NR V2X", Athens, Greece, Feb. 25-Mar. 1, 2019) (Year: 2019).*
NTT DOCOMO, Inc., "Remaining details on DM-RS," R1-1720808, Presented at 3GPP TSG RAN WG1 Meeting #91, Reno, USA, Nov. 27-Dec. 1, 2017, 13 pages.
Samsung, "On Physical Layer Procedures for NR V2X," R1-1902274, Presented at 3GPP TSG RAN WG1 #96, Athens, Greece, Feb. 25-Mar. 1, 2019, 13 pages.

(Continued)

*Primary Examiner* — Maharishi V Khirodhar
(74) *Attorney, Agent, or Firm* — Fish & Richardson P.C.

(57) ABSTRACT

A method for performing wireless communication by a first device and a device for supporting same are provided. The method may include receiving a plurality of reference signals from a second device through a physical sidelink control channel (PSCCH) or a physical sidelink shared channel (PSSCH), herein, the plurality of reference signals are transmitted through a plurality of antenna ports, determining a reference signal received power (RSRP) value using the plurality of reference signals based on indexes for the plurality of antenna ports, and transmitting the RSRP value to the second device.

15 Claims, 29 Drawing Sheets

(56) References Cited

OTHER PUBLICATIONS

Ericsson, "DMRS design for Rel. 15 V2X transmissions with transmit diversity," 3GPP TSG RAN WG1 Meeting #90, R1-1713990, Prague, Czech Republic, Aug. 21-25, 2017, 8 pages.
Extended European Search Report in European Application No. 20802161.8, dated May 31, 2022, 11 pages.
Intel Corporation, "Design of Physical layer procedures for NR V2X sidelink communication," 3GPP TSG RAN WG1 RAN#96is, R1-1904299, Xi'an, China, Apr. 8-12, 2019, 11 pages.
Samsung, "Feature lead summary for agenda item 7.2.4.1 Physical layer structure for sidelink," 3GPP TSG RAN WG1 #96bis Meeting, R1-1905665, Xi'an, China, Apr. 8-12, 2019, 21 pages.

\* cited by examiner

FIG. 12
Option 1A
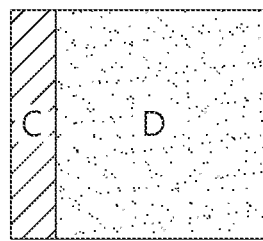
Option 1B
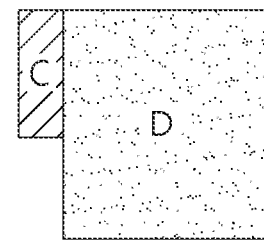
Option 2
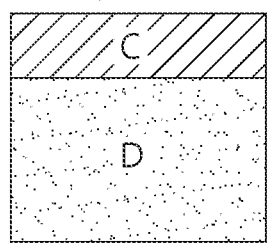
Option 3
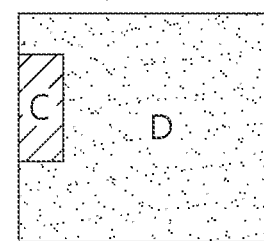
Frequency
↑
└→ Time
 : PSCCH   : PSSCH

METHOD AND DEVICE FOR DETERMINING RSRP IN NR V2X

CROSS-REFERENCE TO RELATED APPLICATIONS

Pursuant to 35 U.S.C. § 119(e), this application is a continuation of International Application PCT/KR2020/005916, with an international filing date of May 4, 2020, which claims the benefit of U.S. Provisional Patent Application No. 62/843,355, filed on May 3, 2019, and U.S. Provisional Patent Application No. 62/843,353, filed on May 3, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in wireless communication system, a UE may perform reference signal received power (RSRP) measurement by using reference signals transmitted through a plurality of antenna ports. For example, the UE may perform RSRP measurement using reference signals transmitted through a plurality of antenna ports on a pre-defined channel. For example, RSRP measurement may include L1 RSRP measurement. For example, when measuring RSRP for demodulation reference signal (DM-RS) on a physical sidelink control channel(PSCCH)/physical sidelink shared channel(PSSCH) during the sensing operation of the UE, the UE may perform RSRP measurement using reference signals transmitted through a plurality of antenna ports. For example, for estimating the sidelink pathloss of the transmitting UE, when the receiving UE measures/reports RSRP for a sidelink channel state information (CSI)-RS or a DM-RS on a PSCCH/PSSCH, the receiving UE may perform RSRP measurement by using RSs transmitted through a plurality of antenna ports. A method for efficiently supporting RSRP measurement using reference signals transmitted through a plurality of antenna ports may be required.

Technical Solutions

In an embodiment, there is provided a method of performing wireless communication by a first device. The method may include receiving a plurality of reference signals from a second device through a physical sidelink control channel (PSCCH) or a physical sidelink shared channel (PSSCH), herein, the plurality of reference signals are transmitted through a plurality of antenna ports, determining a reference signal received power (RSRP) value using the plurality of reference signals based on indexes for the plurality of antenna ports, and transmitting the RSRP value to the second device.

Effects of the Disclosure

A UE may effectively perform sidelink communication.

BRIEF DESCRIPTION OF THE DRAWINGS

FIG. 12 shows multiplexing cases of a PSCCH and a PSSCH related with the PSCCH, in accordance with an embodiment of the present disclosure.

DESCRIPTION OF EXEMPLARY EMBODIMENTS

Figure 1:
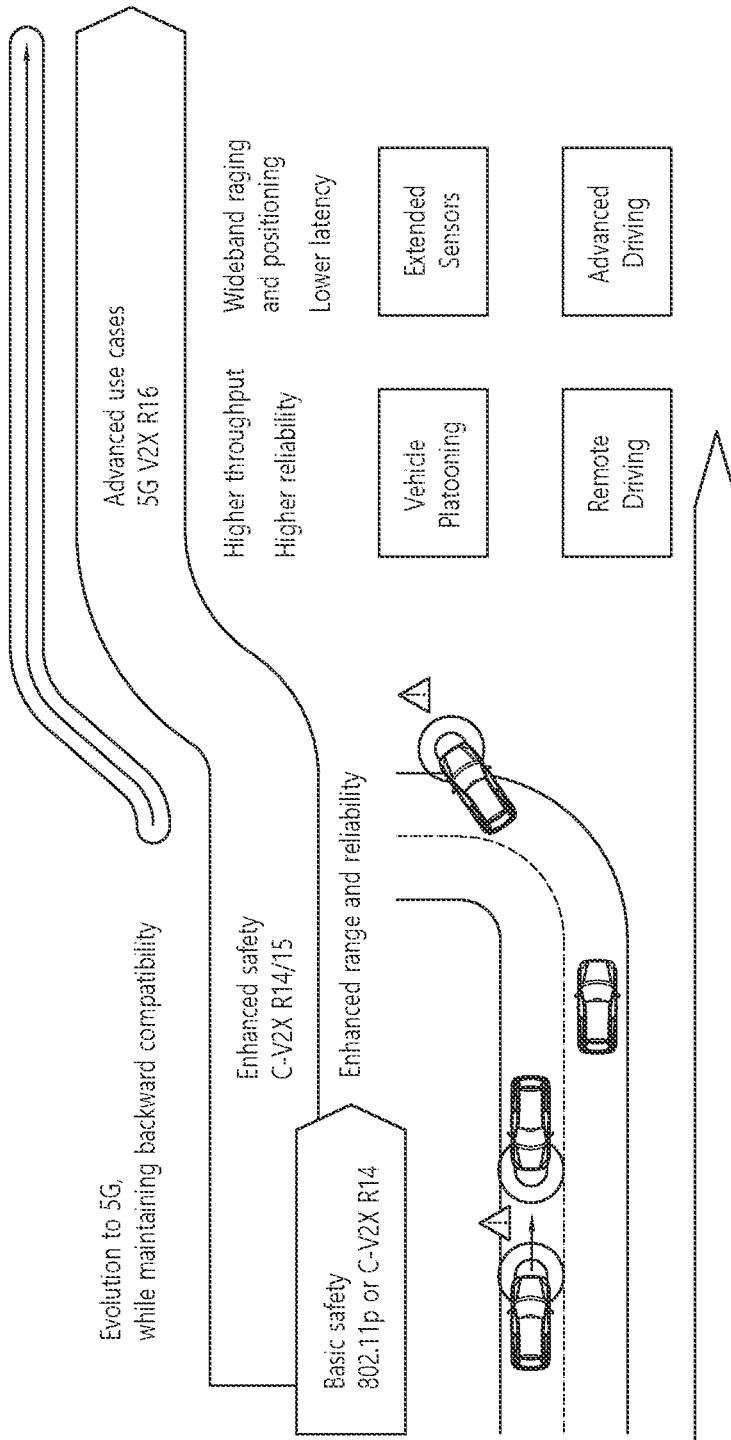
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
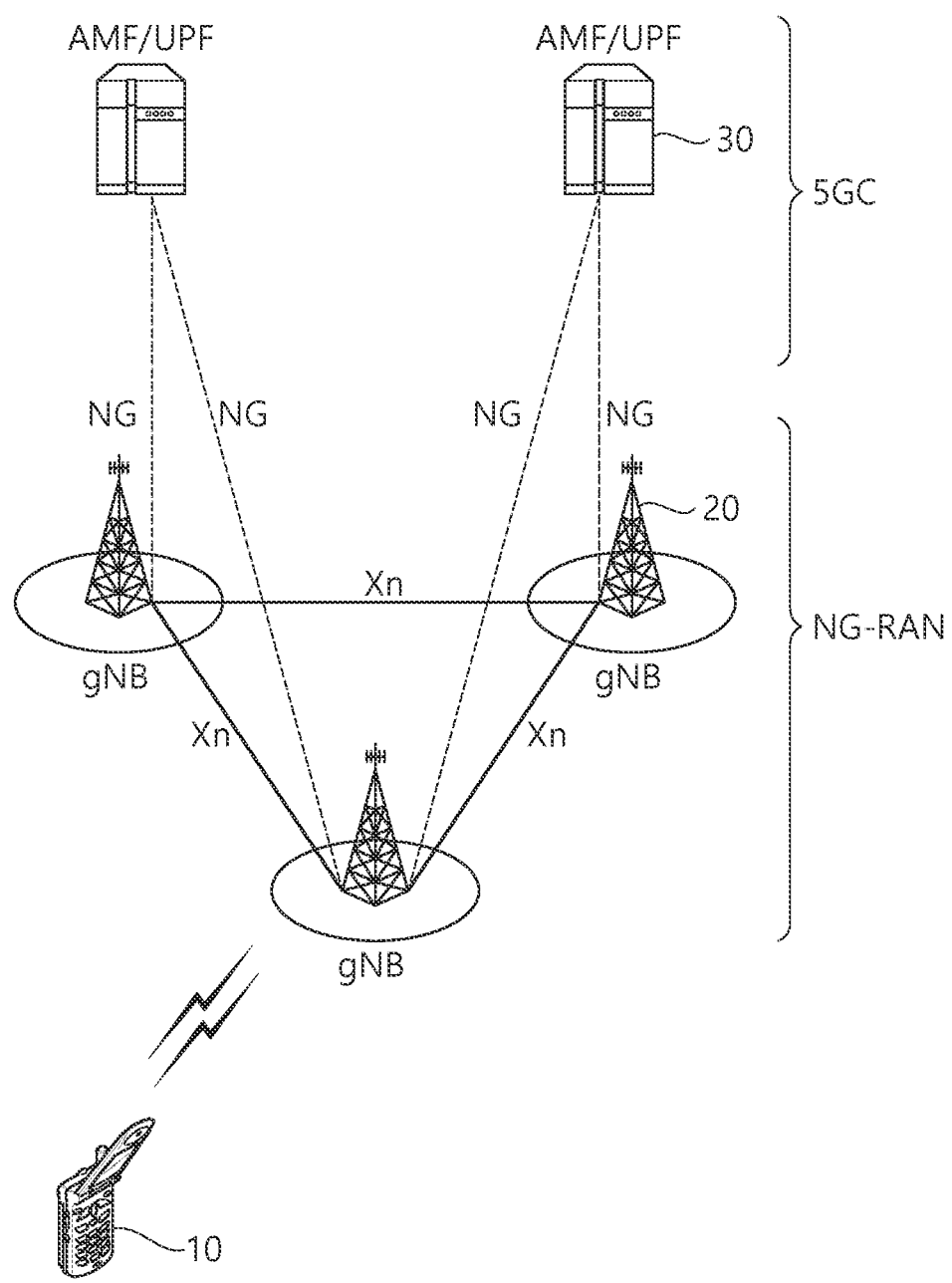
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
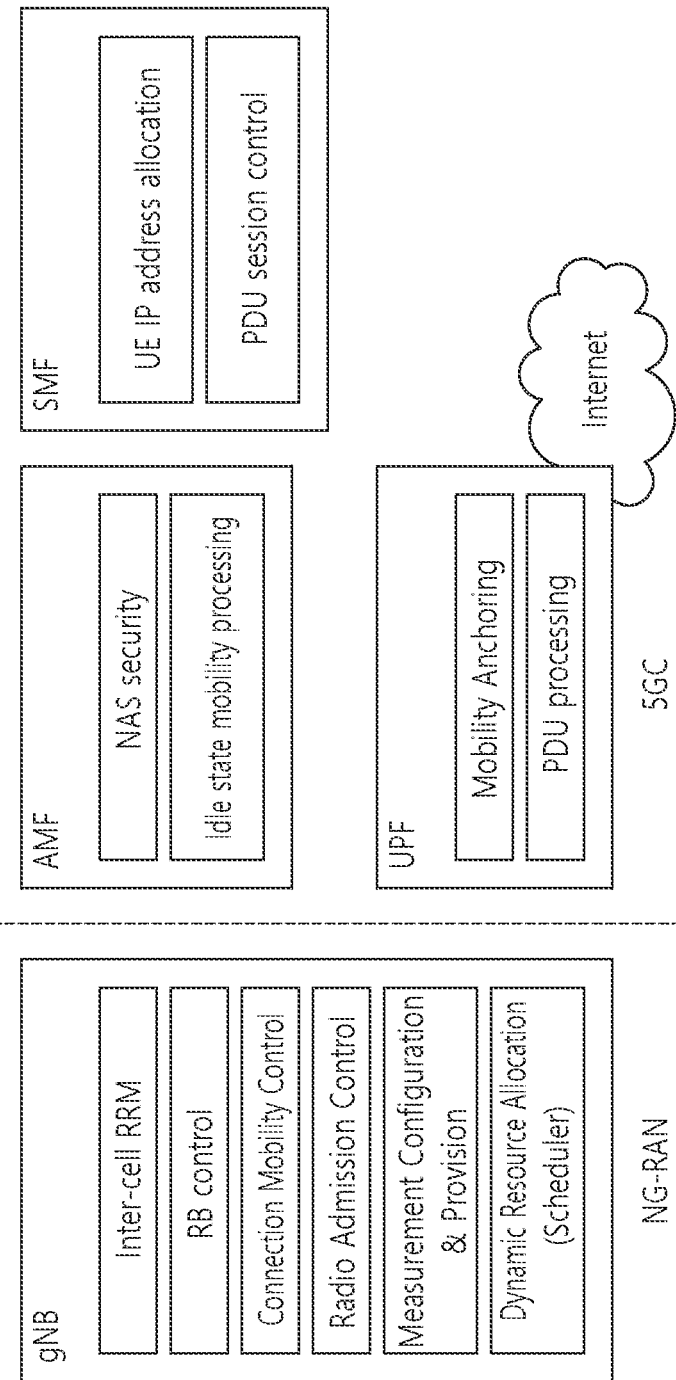
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
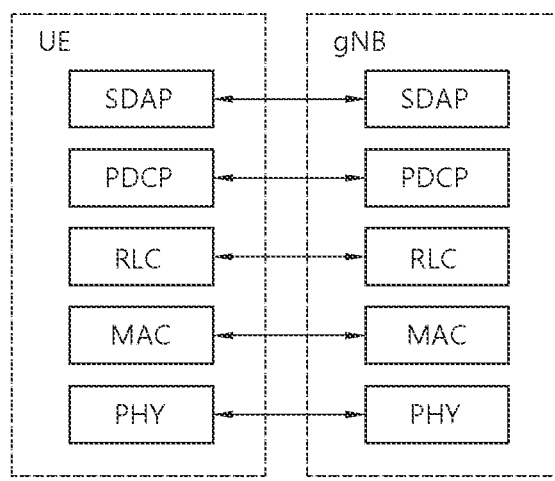
FIG. 4 shows a radio protocol architecture, in accordance with an embodiment of the present disclosure.
Figure 4B:
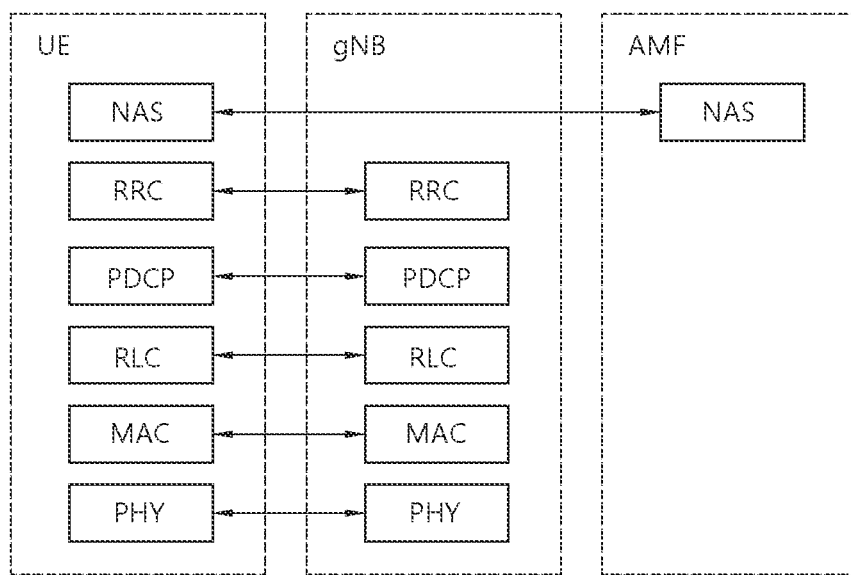

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
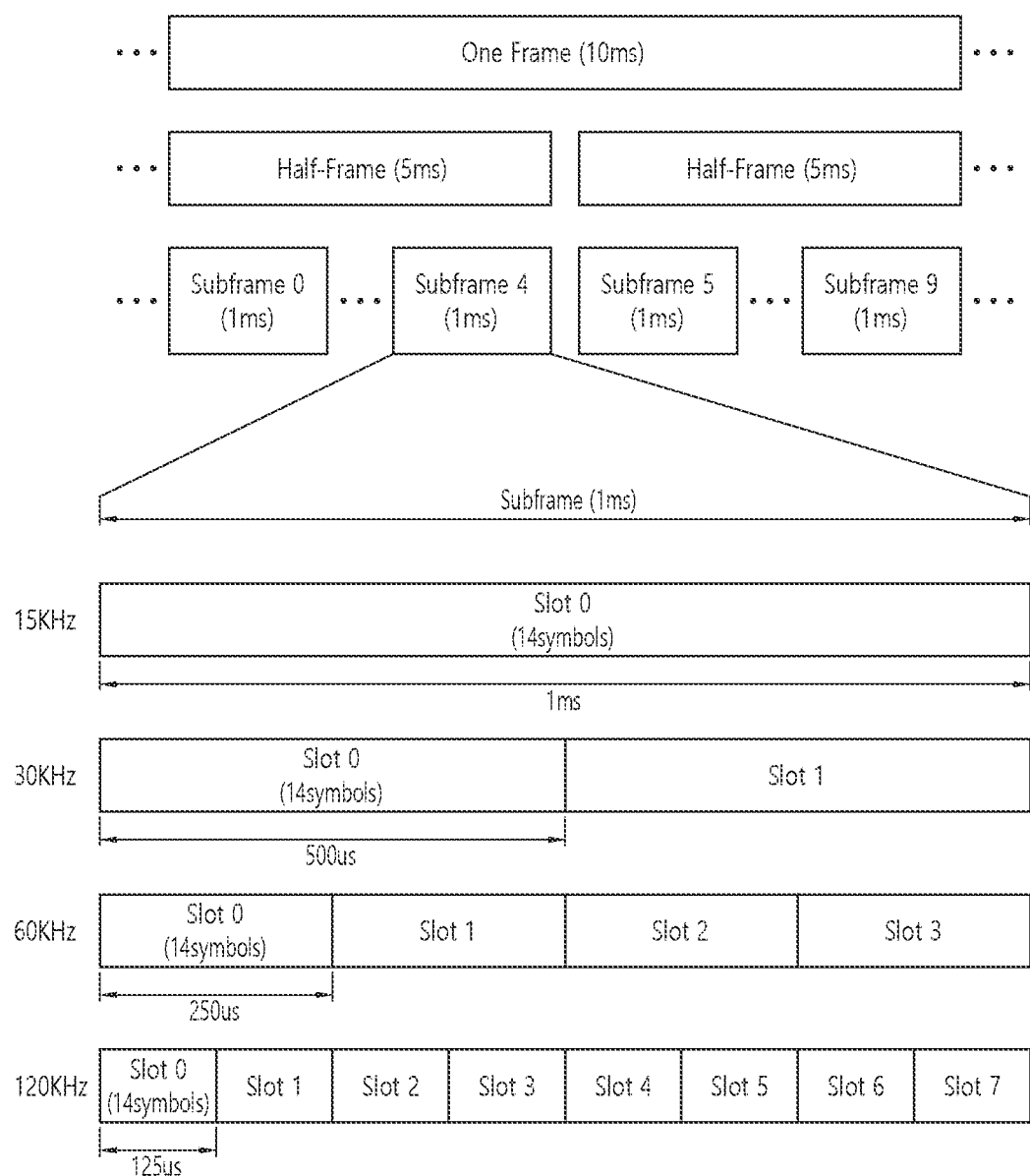
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
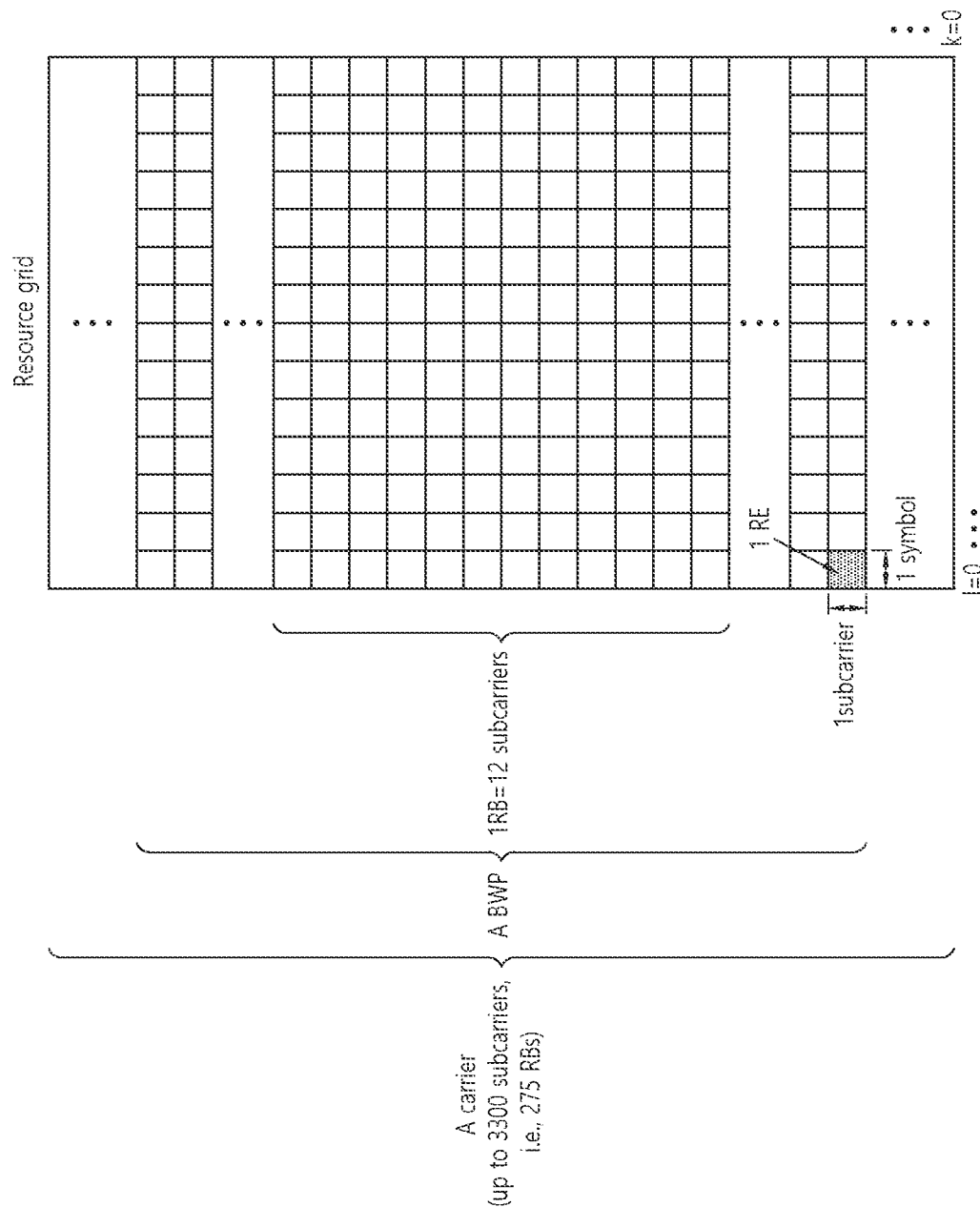
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
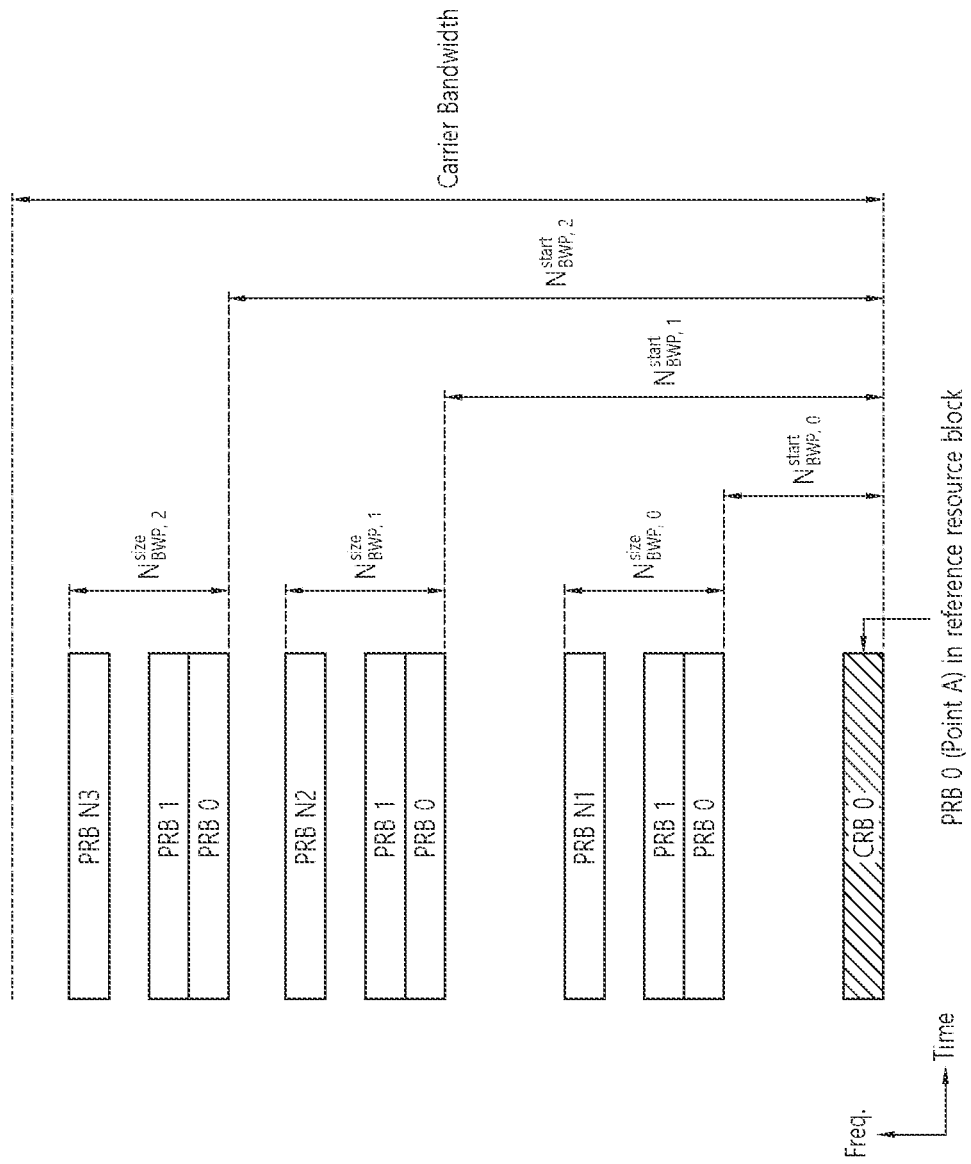
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
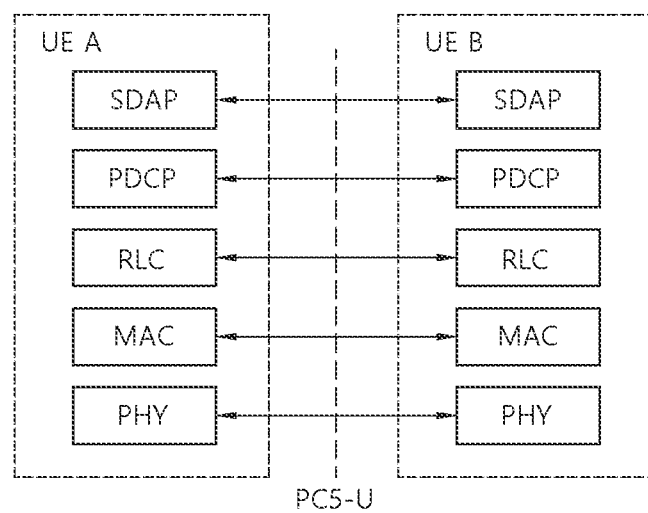
FIG. 8 shows a radio protocol architecture for a SL communication, in accordance with an embodiment of the present disclosure.
Figure 8B:
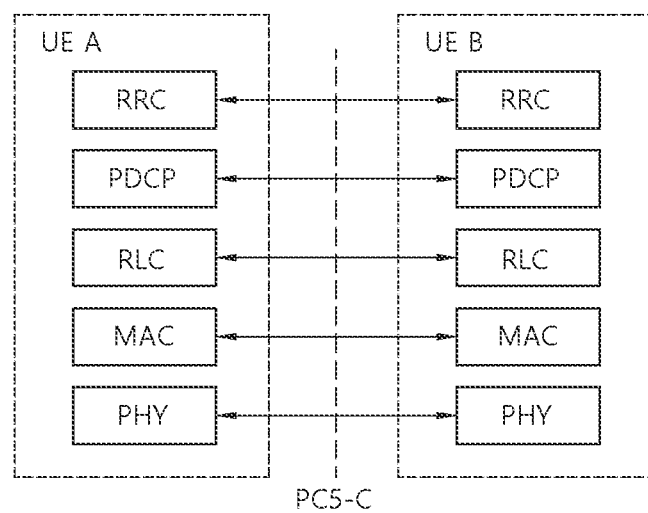

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
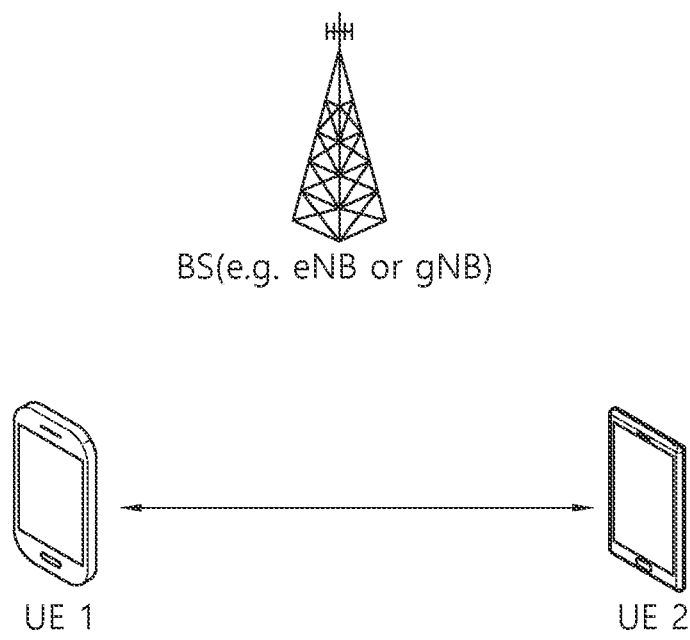
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

Figure 10A:
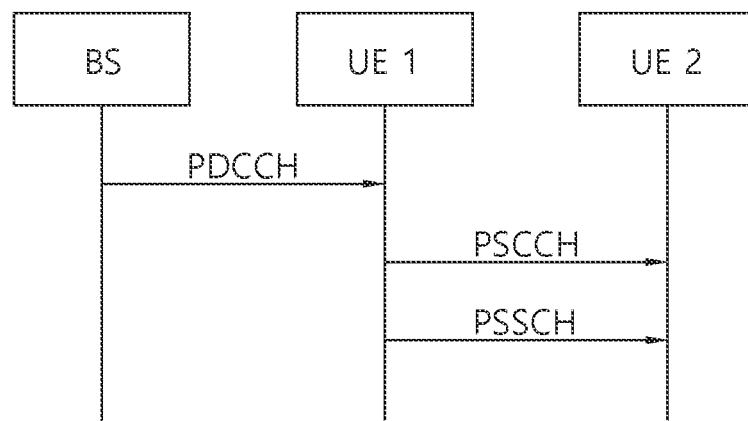
FIG. 10 shows a procedure of performing V2X or SL communication by a UE based on a transmission mode, in accordance with an embodiment of the present disclosure.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

Figure 10B:
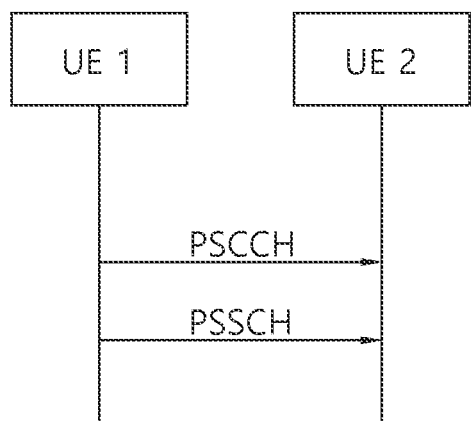

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
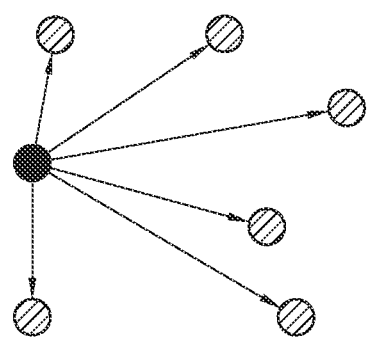
FIG. 11 shows three cast types, in accordance with an embodiment of the present disclosure.
Figure 11B:
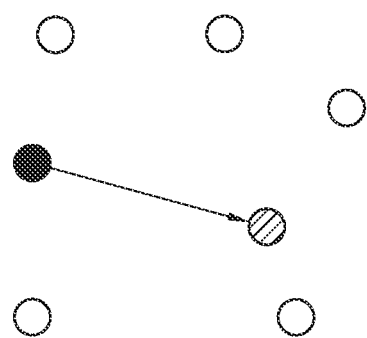
Figure 11C:
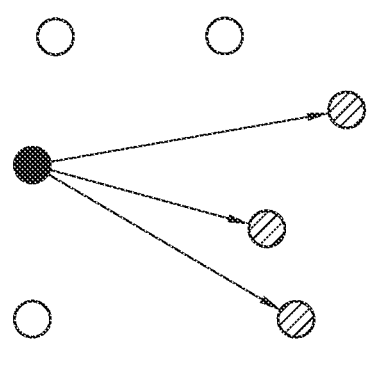

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present disclosure, for example, a transmitting UE (TX UE) may be a UE transmitting data to a (target) receiving UE (RX UE). For example, a TX UE may be a UE performing PSCCH and/or PSSCH transmission. And/or, for example, a TX UE may be a UE that transmits an SL CSI-RS and/or SL CSI report request indicator to a (target) RX UE. And/or, for example, a TX UE may be a UE that transmits a reference signal (e.g., DM-RS, CSI-RS) on a channel and/or the (control) channel (e.g., PSCCH, PSSCH) to be used for the SL RLM and/or SL RLF operation of a (target) RX UE.

Meanwhile, in various embodiments of the present disclosure, for example, a receiving UE (RX UE) may be a UE transmitting SL HARQ feedback to a transmitting UE (TX UE) according to whether decoding of data received from the TX UE succeeds and/or whether the detection/decoding success of a PSCCH (related to a PSSCH scheduling) transmitted by the TX UE. And/or, for example, a RX UE may be a UE that performs SL CSI transmission to a TX UE based on the SL CSI-RS and/or the SL CSI report request indicator received from the TX UE. And/or, for example, a RX UE is a UE that transmits to a TX UE a SL (L1) RSRP measurement value measured based on a (pre-defined) reference signal and/or the SL (L1) RSRP report request indicator received from the TX UE. And/or, for example, a RX UE may be a UE that transmits its own data to a TX UE. And/or, for example, a RX UE may be a UE that performs SL RLM and/or SL RLF operations based on a reference signal on a (control) channel and/or a (pre-configured) (control) channel received from a TX UE.

Meanwhile, in various embodiments of the present disclosure, for example, when the RX UE transmits SL HARQ feedback information for the PSSCH and/or PSCCH received from the TX UE, the following scheme or some of the following schemes may be considered. Herein, for example, the following scheme or some of the following schemes may be limitedly applied only when the RX UE successfully decodes/detects the PSCCH scheduling the PSSCH.

(1) Groupcast HARQ feedback option 1: NACK information may be transmitted to the TX UE only when the RX UE fails to decode/receive the PSSCH received from the TX UE.

(2) Groupcast HARQ feedback option 2: When the RX UE succeeds in decoding/receiving the PSSCH received from the TX UE, ACK information may be transmitted to the TX UE, and when PSSCH decoding/reception fails, NACK information may be transmitted to the TX UE.

Meanwhile, in various embodiments of the present disclosure, for example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on a PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information, information on the number of antenna ports Meanwhile, in various embodiments of the present disclosure, for example, since the TX UE may transmit the SCI, the first SCI and/or the second SCI to the RX UE through the PSCCH, the PSCCH may be replaced/substituted with at least one of SCI, first SCI, and/or second SCI. And/or, for example, the SCI may be replaced/replaced by the PSCCH, the first SCI and/or the second SCI. And/or, for example, since the TX UE may transmit the second SCI to the RX UE through the PSSCH, the PSSCH may be replaced/substituted with the second SCI.

Meanwhile, in various embodiments of the present disclosure, for example, when SCI configuration fields are divided into two groups in consideration of the (relatively) high SCI payload size, the first SCI including the first SCI configuration field group may be referred to as 1st SCI, and the second SCI including the second SCI configuration field group may be referred to as 2nd SCI. In addition, for example, the 1st SCI may be transmitted to the receiving UE through the PSCCH. In addition, for example, the 2nd SCI may be transmitted to the receiving UE through (independent) PSCCH, or may be piggybacked with data through PSSCH and transmitted.

Meanwhile, in various embodiments of the present disclosure, "configuration" or "define" may mean (resource pool specific) (pre-) configuration from a base station or network (via pre-defined signaling (e.g., SIB, MAC, RRC, etc.)).

Meanwhile, in this specification, for example, since RLF may be determined based on an OUT-OF-SYNCH (OOS) indicator or an IN-SYNCH (IS) indicator, RLF may be replaced/replaced by an OUT-OF-SYNCH (OOS) or an IN-SYNCH (IS).

Meanwhile, in various embodiments of the present disclosure, a resource block (RB) may be replaced/substituted with a sub-carrier. In addition, for example, in the present disclosure, a packet or traffic may be substituted/replaced with a transport block (TB) or MAC PDU according to a transmitted layer.

Meanwhile, in various embodiments of the present disclosure, for example, a CBG may be replaced/substituted with a TB.

Meanwhile, in various embodiments of the present disclosure, for example, a source ID may be replaced/substituted with a destination ID.

Meanwhile, in various embodiments of the present disclosure, for example, a L1 ID may be replaced/substituted by a L2 ID. For example, a L1 ID may be a L1 source ID or a L1 destination ID. For example, a L2 ID may be a L2 source ID or a L2 destination ID.

Meanwhile, in various embodiments of the present disclosure, a channel may be replaced/substituted with a signal. For example, transmission/reception of a channel may include transmission/reception of a signal. For example, transmission/reception of a signal may include transmission/reception of a channel.

Meanwhile, in various embodiments of the present disclosure, for example, a cast type may be interchanged/substituted with a unicast, a groupcast, and/or a broadcast. For example, a cast type may be interchanged/substituted with at least one of unicast, groupcast, and/or broadcast. For example, the cast or cast type may include unicast, groupcast and/or broadcast.

Meanwhile, in various embodiments of the present disclosure, for example, resources may be interchanged/replaced with slots or symbols.

Meanwhile, in various embodiments of the present disclosure, for convenience of explanation, for example, a (physical) channel used when the RX UE transmits at least one of the following information to the TX UE may be referred to as a PSFCH.

SL HARQ feedback, SL CSI, SL (L1) RSRP

Meanwhile, in various embodiments of the present disclosure, the sidelink information may include at least one of a sidelink message, a sidelink packet, a sidelink service, sidelink data, sidelink control information, and/or a sidelink transport block (TB). For example, the sidelink information may be transmitted through a PSSCH and/or a PSCCH.

Meanwhile, in various embodiments of the present disclosure, the UE may perform RSRP measurement by using reference signals transmitted through a plurality of antenna ports. For example, the UE may perform RSRP measurement using reference signals transmitted through a plurality of antenna ports on a pre-defined channel. For example, RSRP measurement may include L1 RSRP measurement.

For example, when measuring RSRP for DM-RS on a PSCCH/PSSCH during the sensing operation of the UE, the UE may perform RSRP measurement using reference signals (RSs) transmitted through a plurality of antenna ports. Herein, for example, for a sensing operation of a different UE, PSSCH DM-RS rank information and/or PSSCH DM-RS antenna port information may be signaled through 1st SCI (e.g., PSCCH).

For example, for estimating the sidelink pathloss of the transmitting UE, when the receiving UE measures/reports RSRP for a sidelink CSI-RS or a DM-RS on a PSCCH/PSSCH, the receiving UE may perform RSRP measurement by using RSs transmitted through a plurality of antenna ports.

Various embodiments of the present disclosure propose a method for efficiently supporting RSRP measurement using reference signals transmitted through a plurality of antenna ports.

According to an embodiment of the present disclosure, after the UE measures RSRP for each reference signal of a different antenna port index, the UE may consider the sum of the measured RSRP values as the final/representative RSRP measurement value. For example, after the UE measures RSRP for all reference signals of different antenna port indexes, the UE may determine the sum of the measured RSRP values as the final/representative RSRP measurement value. For example, after the UE measures RSRP for each RS of a pre-configured number (e.g., K) of AP indexes, the UE may determine the sum of the measured RSRP values as the final/representative RSRP measurement value. For example, after the UE measures RSRP for each RS of the pre-configured relatively high K AP indexes, the UE may determine the sum of the measured RSRP values as the final/representative RSRP measurement value. For example, after the UE measures RSRP for each RS of the pre-configured relatively low K AP indexes, the UE may determine the sum of the measured RSRP values as the final/representative RSRP measurement value. For example, the relatively high AP index may be an AP index having an index value higher than a specific value. For example, the relatively low AP index may be an AP index having an index value lower than a specific value.

For example, after the UE measures RSRP for all reference signals of different antenna port indexes, the UE may determine the maximum or minimum value among the measured RSRP values as the final/representative RSRP measurement value. For example, after the UE measures RSRP for each RS of a pre-configured number (e.g., K) of AP indexes, the UE may determine the maximum or minimum value among the measured RSRP values as the final/representative RSRP measurement value. For example, after the UE measures RSRP for each RS of a pre-configured relatively high K AP index, the UE may determine the maximum or minimum value among the measured RSRP values as the final/representative RSRP measurement value. For example, after the UE measures RSRP for each RS of a pre-configured relatively low K AP index, the UE may determine the maximum or minimum value among the measured RSRP values as the final/representative RSRP measurement value.

For example, after the UE measures RSRP for all reference signals of different antenna port indexes, respectively, the UE may determine an average value or a weighted average value of the measured RSRP values as the final/representative RSRP measurement value. For example, after the UE measures RSRP for each RS of a pre-configured number (e.g., K) of AP indexes, the UE may determine an average value or a weighted average value of the measured RSRP values as the final/representative RSRP measurement value. For example, after the UE measures RSRP for each RS of a pre-configured relatively high K AP index, the UE determines the average value or weighted average value of the measured RSRP values as the final/representative RSRP measurement value. For example, after the UE measures the RSRP for each RS of a pre-configured relatively low K AP indexes, the UE determines the average value or the weighted average value of the measured RSRP values as the final/representative RSRP measurement value.

For example, if K is 1, the RSRP measurement value for the RS of the corresponding antenna port index may be the final/representative value. For example, if K is 1, the UE may measure the RSRP for the reference signal of the antenna port index where K is 1 among the two different antenna port indexes, and the UE may determine the final/representative RSRP value based on the measured RSRP value.

According to an embodiment of the present disclosure, after the UE measures RSRP value for a reference signal of one pre-configured antenna port index, the UE may derive/determine the final/representative RSRP value by adding a pre-configured offset value. For example, the pre-configured offset value may be determined based on the number of antenna ports used to transmit the reference signal. For example, the pre-configured offset value may be determined based on a rank value related to the reference signal. For example, the pre-configured offset value may be 10*log(the number of antennas used to transmit the reference signal). For example, the pre-configured offset value may be $10*\log_2$(the number of antennas used to transmit the reference signal). For example, the pre-configured offset value may be 10*log(a rank value related to the reference signal). For example, the pre-configured offset value may be $10*\log_2$(a rank value related to the reference signal). For example, the pre-configured offset value may be 10*log 2.

Herein, for example, the pre-configured offset value may be configured/determined differently according to service type, priority, service requirement (e.g., priority, reliability, latency, minimum required communication range), cast type (e.g., unicast, groupcast, broadcast) and/or congestion level.

For example, after the UE measures the RSRP value for the reference signal of the highest pre-configured antenna port index, the UE may derive/determine the final/representative RSRP value by adding a pre-configured offset value. For example, after the UE measures the RSRP value for the reference signal of one of the lowest pre-configured antenna port index, the UE may derive/determine the final/representative RSRP value by adding a pre-configured offset value.

FIG. 12 shows multiplexing cases of a PSCCH and a PSSCH related with the PSCCH, in accordance with an embodiment of the present disclosure. The embodiment of FIG. 12 may be combined with various embodiments of the present disclosure.

Referring to FIG. 12, multiplexing cases of a PSCCH and a PSSCH related with the PSCCH may include option 1, option 2, and option 3. For example, option 1 may include option 1A and option 1B. For example, the meaning of "related" in the PSSCH related with the PSCCH may mean that the PSCCH transmits at least information necessary for decoding the PSSCH.

For example, option 1 may be that the PSCCH and the related PSSCH are transmitted using non-overlapping time resources. For example, in option 1A, the frequency resources used by the PSCCH and the related PSSCH may be the same. For example, in option 1B, frequency resources used by the PSCCH and the related PSSCH may be different. For example, option 2 may be that the PSCCH and the related PSSCH may be transmitted using non-overlapping frequency resources in all time resources used for transmission. For example, the time resource used by the two channels may be the same. For example, in option 3, the PSCCH and a part of the related PSSCH may be transmitted using overlapping time resources in non-overlapping frequency resources, and another part of the related PSSCH and/or another part of the PSCCH may be transmitted using non-overlapping time resources.

In various embodiments of the present disclosure, on the same symbol, information on whether or not frequency division multiplexing (FDM) between a reference signal and data and/or ratio information of energy per resource element (EPRE)/power spectral density (PSD) between a reference signal and data (e.g., data being performed FDM) on the same symbol may be provided by predefined signaling. For example, the UE may receive information on whether FDM between a reference signal and data and/or information on a ratio of EPRE/PSD between a reference signal and data (e.g., data being performed FDM) through predefined signaling. For example, the UE may receive information on whether FDM between a reference signal and data on the same symbol and/or information on a ratio of EPRE/PSD between a reference signal and data (e.g., data being performed FDM) on the same symbol through SCI or resource pool-specific configuration.

For example, if information on whether FDM between a reference signal and data and/or information on a ratio of EPRE/PSD between a reference signal and data is provided to the UE, when the UE measures the RSRP for the reference signal, the RSRP value may be compensated in consideration of specific information. For example, when the UE measures the RSRP for the reference signal, the UE may compensate the RSRP value based on a ratio occupied by the RE related to the reference signal among all REs in the same symbol or a ratio of power occupied by the RE related to the reference signal among the total symbol power in the same symbol. For example, when the UE measures the RSRP for the reference signal, the UE may compensate the RSRP value based on 10*log(a ratio of the RE related to the reference signal among all REs in the same symbol) or 10*log(a ratio of power for the RE related to the reference signal among the total symbol power). For example, when the UE measures the RSRP for the reference signal, the UE may compensate the RSRP value based on $10*\log_2$(a ratio of the RE related to the reference signal among all REs in the same symbol) or $10*\log_2$(a ratio of power for the RE related to the reference signal among the total symbol power).

In various embodiments of the present disclosure, referring to FIG. 12, when the PSCCH/PSSCH multiplexing of the option 3 is used, the UE may not use the DM-RS on the PSSCH area being performed FDM with the PSCCH for RSRP measurement. For example, when PSCCH PSD/EPRE boosting is performed, the UE may not use the DM-RS on the PSSCH area being performed FDM with the PSCCH for RSRP measurement.

For example, when the PSCCH/PSSCH multiplexing of the option 3 is used, the UE may use the PSCCH and the DM-RS on the PSSCH area being performed FDM for RSRP measurement, and the UE may compensate for the power value borrowed due to PSD/EPRE boosting of the PSCCH. That is, for example, the UE compensates for the power value borrowed due to PSD/EPRE boosting of the PSCCH being performed FDM, and the UE may average the RSRP measurement value for the DM-RS on the PSSCH area being performed FDM and the DM-RS on the PSSCH area being not performed FDM. For example, when the PSCCH/PSSCH multiplexing of the option 3 is used, the UE may use the PSCCH and the DM-RS on the PSSCH area being performed FDM for RSRP measurement, and the UE may compensate for a pre-configured offset value. That is, for example, the UE compensates the pre-configured offset value for the RSRP measurement value, and the UE may average the RSRP measurement value for the DM-RS on the PSSCH area being performed FDM and the DM-RS on the PSSCH area being not performed FDM.

Figure 13:
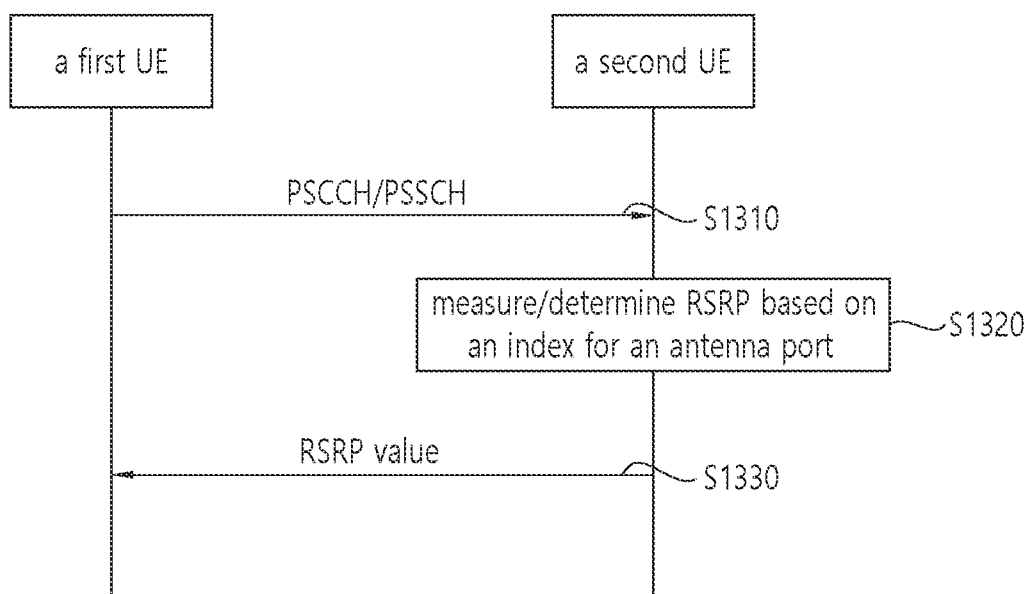
FIG. 13 shows a procedure for a UE to determine RSRP based on an index of an antenna port, in accordance with an embodiment of the present disclosure.

FIG. 13 shows a procedure for a UE to determine RSRP based on an index of an antenna port, in accordance with an embodiment of the present disclosure. The embodiment of FIG. 13 may be combined with various embodiments of the present disclosure.

Referring to FIG. 13, in step S1310, a first UE may transmit a reference signal on a PSCCH/PSSCH to a second UE. For example, a reference signal may be a DM-RS or a sidelink CSI-RS. For example, the first UE may transmit a DM-RS on a PSCCH/PSSCH to the second UE. For example, the first UE may transmit a DM-RS on a PSCCH/PSSCH to the second UE using at least one antenna port.

In step S1320, the second UE may measure/determine RSRP based on an index for an antenna port. For example, the second UE may measure RSRP for each reference signal corresponding to an index for a different antenna port. For example, the second UE may measure RSRP for each of reference signals corresponding to indices for pre-configured K antenna ports. For example, the second UE may measure RSRP for each of the reference signals corresponding to a pre-configured K antenna ports having a relatively low index. For example, the second UE may measure RSRP for each of the reference signals corresponding to a pre-configured K antenna ports having a relatively high index. For example, the second UE may determine the sum of the measured RSRP values as the final/representative RSRP measurement value. For example, the second UE may determine the highest RSRP value among the measured RSRP values as the final/representative RSRP measurement value. For example, the second UE may determine the lowest RSRP value among the measured RSRP values as the final/representative RSRP measurement value.

For example, when the value of K is 1 and the number of antenna ports through which the reference signal is transmitted is two, the second UE may measure RSRP for the reference signal of the antenna port index in which K is 1 among the two different antenna port indexes, and the second UE may determine the final/representative RSRP value based on the measured RSRP value.

For example, after the second UE measures the RSRP value for the reference signal of one pre-configured antenna port index, the second UE may derive/determine a final/representative RSRP value by adding a pre-configured first offset value to the measured RSRP value. For example, after the second UE measures the RSRP value for the reference signal of the pre-configured highest antenna port index, the second UE may derive/determine a final/representative RSRP value by adding a pre-configured first offset value to the measured RSRP value. For example, after the second UE measures the RSRP value for the reference signal of the pre-configured lowest antenna port index, the second UE may derive/determine a final/representative RSRP value by adding a pre-configured first offset value to the measured RSRP value. For example, the pre-configured first offset value may be determined based on the number of antenna ports used for transmitting the reference signal. For example, the pre-configured first offset value may be determined based on a rank value related to the reference signal. For example, the pre-configured first offset value may be $10*\log$(the number of antennas used to transmit the reference signal). For example, the pre-configured first offset value may be $10*\log_2$(the number of antennas used to transmit the reference signal). For example, the pre-configured first offset value may be $10*\log 2$. For example, the pre-configured first offset value may be configured/determined differently according to service type, priority, service requirement (e.g., priority, reliability, latency, minimum required communication range), cast type (e.g., unicast, groupcast, broadcast) and/or congestion level.

In step S1330, the second UE may transmit the RSRP value to the first UE. For example, the RSRP value may be a final/representative RSRP measurement value determined based on the index for the antenna port. For example, the RSRP value may be a final/representative RSRP measurement value obtained by adding a pre-configured first offset value to the measured RSRP value.

Figure 14:
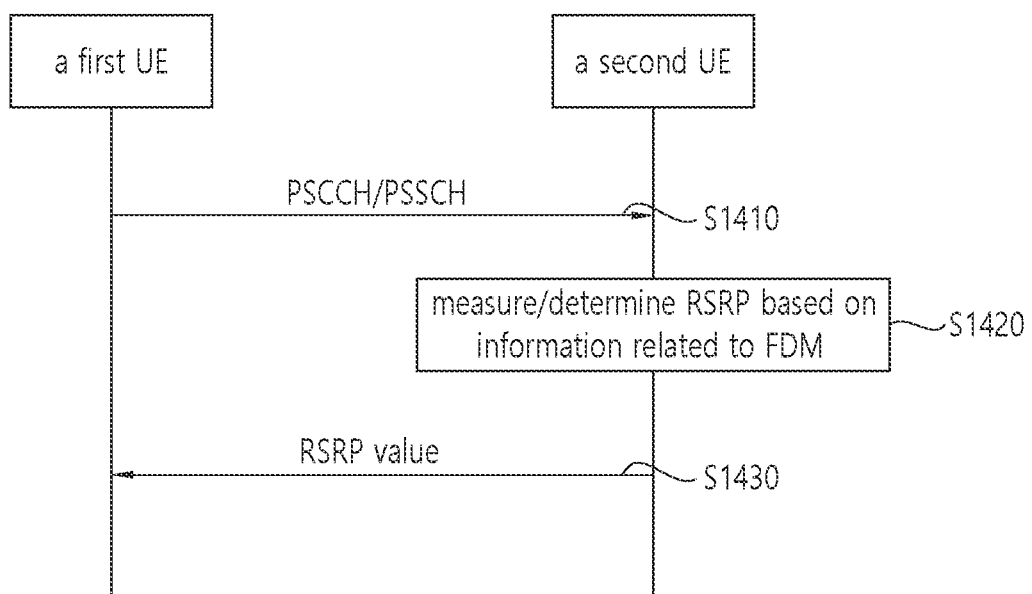
FIG. 14 shows a procedure for a UE to determine RSRP based on information related to FDM in accordance with an embodiment of the present disclosure.

FIG. 14 shows a procedure for a UE to determine RSRP based on information related to FDM in accordance with an embodiment of the present disclosure. The embodiment of FIG. 14 may be combined with various embodiments of the present disclosure.

Referring to FIG. 14, in step S1410, a first UE may transmit a reference signal on a PSCCH/PSSCH to a second UE. For example, a reference signal may be a DM-RS or a sidelink CSI-RS. For example, the first UE may transmit a DM-RS on a PSCCH/PSSCH to the second UE.

In step S1420, the second UE may measure/determine RSRP based on information related to FDM. For example, the information related to the FDM includes information on whether or not frequency division multiplexing (FDM) between a reference signal and data and/or ratio information of energy per resource element (EPRE)/power spectral density (PSD) between a reference signal and data (e.g., data being performed FDM) on the same symbol. For example, the information related to the FDM may be provided to the second UE by predefined signaling. For example, the information related to the FDM may be provided to the second UE through a SCI or resource pool-specific configuration.

For example, the second UE may measure the RSRP for the reference signal on the PSCCH/PSSCH. For example, the second UE may compensate the measured RSRP value based on a ratio occupied by at least one RE related to the reference signal among all REs in the same symbol or a ratio of power occupied by at least one RE related to the reference signal among the total symbol power in the same symbol. For example, the second UE may compensate the RSRP value based on $10*\log$(a ratio of at least one RE related to the reference signal among all REs in the same symbol) or $10*\log$(a ratio of power for at least one RE related to the reference signal among the total symbol power). For example, the second UE may compensate the RSRP value based on $10*\log_2$(a ratio of at least one RE related to the reference signal among all REs in the same symbol) or $10*\log_2$(a ratio of power for at least one RE related to the reference signal among the total symbol power).

For example, when the PSCCH/PSSCH multiplexing of the option 3 is used, the second UE may not use the DM-RS on the PSSCH area being performed FDM with the PSCCH for RSRP measurement. For example, when PSCCH PSD/EPRE boosting is performed, the second UE may not use the DM-RS on the PSSCH area being performed FDM with the PSCCH for RSRP measurement.

Alternatively, For example, when the PSCCH/PSSCH multiplexing of the option 3 is used, the second UE may use the PSCCH and the DM-RS on the PSSCH area being performed FDM for RSRP measurement, and the second UE may compensate for the power value borrowed due to PSD/EPRE boosting of the PSCCH. For example, the second UE compensates for the power value borrowed due to PSD/EPRE boosting of the PSCCH being performed FDM, and the second UE may average the RSRP measurement value for the DM-RS on the PSSCH area being performed FDM and the DM-RS on the PSSCH area being not performed FDM. For example, the second UE may determine the RSRP value by adding a pre-configured second offset value to the measured RSRP value, so that the UE averages the RSRP measurement value for the DM-RS on the PSSCH area being performed FDM and the DM-RS on the PSSCH area being not performed FDM.

In step S1430, the second UE may transmit the RSRP value to the first UE. For example, the RSRP value may be an RSRP measurement value compensated based on a ratio occupied by at least one RE related to a reference signal among all REs or a ratio of power occupied by at least one RE related to a reference signal among total symbol power. For example, the RSRP value may be an RSRP measurement value in which a power value borrowed due to PSD/EPRE boosting of the PSCCH is compensated. For example, the RSRP value may be a value obtained by adding a pre-configured second offset value to the measured RSRP value.

Figure 15:
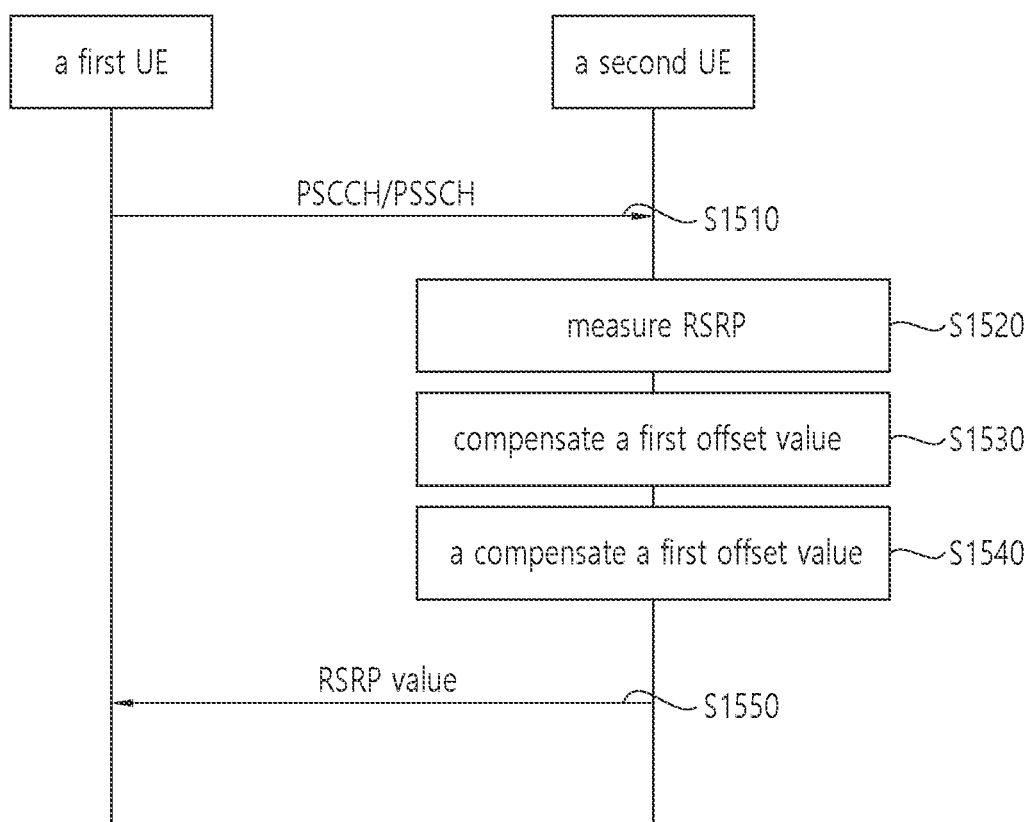
FIG. 15 shows a procedure for compensating for a first offset value and a second offset value to a RSRP value measured by a UE in accordance with an embodiment of the present disclosure.

FIG. 15 shows a procedure for compensating for a first offset value and a second offset value to a RSRP value measured by a UE in accordance with an embodiment of the present disclosure. The embodiment of FIG. 15 may be combined with various embodiments of the present disclosure.

In FIG. 15, it may be assumed that a first UE transmits a reference signal on PSCCH/PSSCH using at least one antenna port, and that the reference signal and data are performed FDM.

Referring to FIG. 15, in step S1510, a first UE may transmit a reference signal on a PSCCH/PSSCH to a second UE. For example, a reference signal may be a DM-RS or a sidelink CSI-RS. For example, the first UE may transmit a DM-RS on a PSCCH/PSSCH to the second UE. For example, the first UE may transmit a DM-RS on a PSCCH/PSSCH to the second UE using at least one antenna port.

In step S1520, the second UE may measure RSRP. For example, the second UE may measure RSRP for each reference signal corresponding to an index for a different antenna port. For example, the second UE may measure RSRP for each of reference signals corresponding to indices for pre-configured K antenna ports. For example, the second UE may measure RSRP for each of the reference signals corresponding to a pre-configured K antenna ports having a relatively high index. For example, the second UE may measure a RSRP value for the reference signal of one pre-configured antenna port index. For example, when the PSCCH/PSSCH multiplexing of the option 3 described above is used, the second terminal may not use a reference signal on the PSSCH area being performed FDM with the PSCCH for RSRP measurement. That is, for example, when the PSCCH/PSSCH multiplexing of the option 3 described above is used for a reference signal transmitted using at least one antenna port, the second UE may measure RSRP for a reference signal corresponding to an index for one pre-configured antenna port, and a reference signal on the PSSCH area being performed FDM with the PSCCH may not be used for RSRP measurement.

In step S1530, the second UE may compensate a first offset value to the measured RSRP value. For example, the first offset value may be the above-described pre-configured first offset value. For example, the second UE may add the first offset value determined based on the number of antenna ports used to transmit the reference signal to the measured RSRP value. For example, the second UE may add the first offset value determined based on a rank value related to the reference signal to the measured RSRP value. For example, the second UE may add a value of 10*log(the number of antennas used to transmit the reference signal) to the measured RSRP value. For example, the second UE may add a value of $10*\log_2$(the number of antennas used to transmit the reference signal) to the measured RSRP value.

In step S1540, the second UE may compensate a second offset value to the measured RSRP value. For example, the second offset value may be the pre-configured second offset value. For example, the second offset value may be determined based on a ratio occupied by at least one RE related to the reference signal among all REs in the same symbol or a ratio of power occupied by at least one RE related to the reference signal among total symbol power. For example, the second offset value may be determined based on 10*log(a ratio occupied by at least one RE related to the reference signal among all REs in the same symbol) or 10*log (a ratio of power occupied by at least one RE related to the reference signal among total symbol power in the same symbol). For example, the second offset value may be determined based on $10*\log_2$(a ratio occupied by at least one RE related to the reference signal among all REs in the same symbol) or $10*\log_2$(a ratio of power occupied by at least one RE related to the reference signal among total symbol power in the same symbol). For example, the second offset value may be determined based on a power value borrowed due to PSD/EPRE boosting of the PSCCH being performed FDM.

In step S1550, the second UE may transmit the RSRP value to the first UE. For example, the RSRP value may be a value obtained by adding at least one of a first offset value or a second offset value to the RSRP value measured by the second UE.

Meanwhile, according to an embodiment of the present disclosure, in order to alleviate the problem of collision of transmission resources between different UEs, a SCI related to initial transmission may include resource allocation information may include scheduling/resource allocation information related to retransmission (e.g., the number/location of time domain resources, the number/location of frequency domain resources, MCS). For example, a SCI related to retransmission may include scheduling/resource allocation information related to initial transmission.

In this case, for example, if a sidelink CSI-RS is transmitted on initial transmission, it may need to be defined whether the sidelink CSI-RS should be transmitted also on the retransmission. For example, whether to transmit sidelink CSI-RS on retransmission may have to be defined whether it can be independently determined. For example, if the UE transmits a sidelink CSI-RS when performing initial transmission, whether the UE must transmit the sidelink CSI-RS even when performing retransmission may be defined. For example, when the UE performs retransmission, it may be defined whether or not to perform sidelink CSI-RS transmission can be independently determined. For example, if it is defined to independently determine whether to transmit sidelink CSI-RS on retransmission, if the UE fails to receive the SCI related to retransmission, the UE may still determine scheduling/resource allocation information related to retransmission based on the successfully received SCI related to initial transmission. However, since the UE cannot know whether the sidelink CSI-RS (e.g., the sidelink CSI-RS signaled through the retransmission-related SCI) is actually transmitted, the UE may ultimately fail to receive the packet.

Hereinafter, various embodiments of the present disclosure propose a method for efficiently processing sidelink CSI-RS transmission.

For example, when a sidelink CSI report and/or RSRP information is transmitted/piggybacked on initial transmission, various embodiments of the present disclosure may be extended to solve the problem of whether sidelink CSI reporting and/or RSRP information should be included/piggybacked even on retransmission. For example, when transmission based on slot aggregation is performed, if sidelink CSI-RS, sidelink CSI report and/or RSRP information is transmitted/piggybacked on initial transmission, various embodiments of the present disclosure may be extended to solve the problem of whether sidelink CSI-RS, sidelink CSI report and/or RSRP information should be included/piggybacked even on retransmission.

According to an embodiment of the present disclosure, when a UE performs initial transmission related to a transport block (TB), if the UE has transmitted/piggybacked sidelink CSI-RS, sidelink CSI report and/or RSRP information (e.g., L1 RSRP information), it may be configured for the UE to include/piggyback sidelink CSI-RS, sidelink CSI report and/or RSRP information even on retransmission. For example, when a UE performs initial transmission related to a specific TB, if the UE has transmitted/piggybacked sidelink CSI-RS, sidelink CSI report and/or RSRP information (e.g., L1 RSRP information), it may be configured for the UE to include/piggyback sidelink CSI-RS, sidelink CSI report and/or RSRP information even on some or all subsequent retransmissions. For example, when a UE performs initial transmission related to a specific TB, if the UE has transmitted/piggybacked sidelink CSI-RS, sidelink CSI report and/or RSRP information (e.g., L1 RSRP information), it may be configured for the UE not to include/piggyback sidelink CSI-RS, sidelink CSI report and/or RSRP information even on some or all subsequent retransmissions.

For example, an embodiment of the present disclosure may be extended and applied to signaling to the UE information on whether to transmit sidelink CSI-RS on retransmission, through SCI related to initial transmission.

Herein, for example, to reduce the overhead related with the transmission of sidelink CSI-RS, sidelink CSI reporting and/or RSRP information, when the UE performs TB-related transmission a total of N times (e.g., the number of times including all initial transmission/retransmission), with what number, rate, and/or time pattern, sidelink CSI-RS, sidelink CSI report and/or RSRP information transmission should be performed may be configured for the UE. For example, when the UE performs transmission related to a specific TB a total of N times, with what number, rate, and/or time pattern, sidelink CSI-RS, sidelink CSI report and/or RSRP information transmission should be performed may be pre-configured resource pool-specifically for the UE. For example, when the UE performs TB-related transmission a total of 4 times, if a sidelink CSI-RS is transmitted on a first transmission, the UE may be configured to perform the sidelink CSI-RS transmission in a third transmission. For example, when the UE performs TB-related transmission a total of 4 times, if the sidelink CSI-RS is transmitted on a first transmission, the UE may omit the sidelink CSI-RS on a second/fourth transmission.

According to an embodiment of the present disclosure, transmission/piggyback of sidelink CSI-RS, sidelink CSI report and/or RSRP information on retransmission may be defined to be performed/determined independently of operation/form on initial transmission. For example, the UE may perform transmission/piggyback of sidelink CSI-RS, sidelink CSI report and/or RSRP information on retransmission independently of operation/form of initial transmission.

Figure 16:
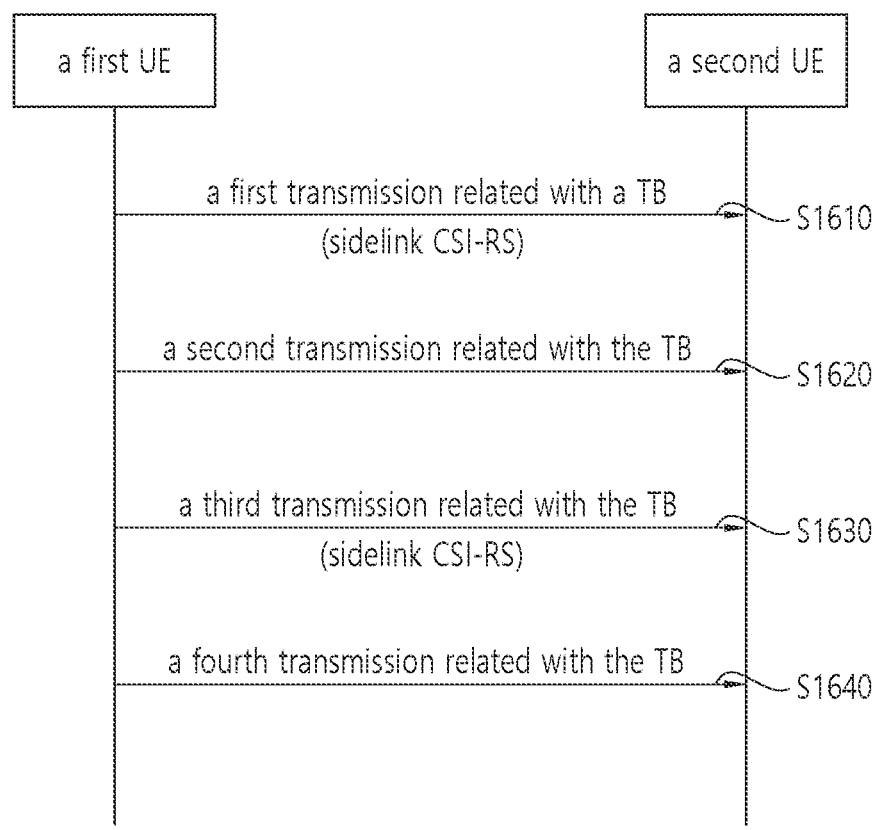
FIG. 16 shows a procedure for a UE to perform a plurality of TB-related transmissions in accordance with an embodiment of the present disclosure.

FIG. 16 shows a procedure for a UE to perform a plurality of TB-related transmissions in accordance with an embodiment of the present disclosure. The embodiment of FIG. 16 may be combined with various embodiments of the present disclosure.

In FIG. 16, when the first UE performs TB-related transmission a total of 4 times, if a sidelink CSI-RS is transmitted based on a first transmission, it may be assumed that the sidelink CSI-RS is configured to be transmitted based on a third transmission. For example, when the first UE performs TB-related transmission 4 times (e.g., the number of times including all initial transmission/retransmission), with what number, rate, and/or time pattern, the transmission of sidelink CSI-RS, sidelink CSI report and/or RSRP information should be performed may be configured for the first UE.

Referring to FIG. 16, in step S1610, a first UE may transmit a sidelink CSI-RS to a second UE on a first transmission related with a TB. For example, the first transmission related with the TB may be an initial transmission. For example, the first UE may transmit/piggyback the sidelink CSI-RS, the sidelink CSI report and/or RSRP information (e.g., L1 RSRP information) on the first transmission related to the TB.

In step S1620, the first UE may perform a second transmission related to the TB to the second UE. For example, the first UE may omit transmission/piggyback of sidelink CSI-RS, sidelink CSI report and/or RSRP information (e.g., L1 RSRP information) on the second transmission related to TB. For example, the first UE may be configured to perform transmission of sidelink CSI-RS, sidelink CSI report and/or RSRP information (e.g., L1 RSRP information) though a third transmission related to TB through predefined signaling. For example, the first UE may omit transmission/piggyback of sidelink CSI-RS, sidelink CSI report and/or RSRP information (e.g., L1 RSRP information) on the second transmission related to TB based on a predefined configuration.

In step S1630, the first UE may transmit the sidelink CSI-RS to the second UE on a third transmission related to the TB. For example, the first UE may transmit/piggyback the sidelink CSI-RS, the sidelink CSI report and/or RSRP information (e.g., L1 RSRP information) on a fourth transmission related to the TB. For example, the first UE may be configured to perform transmission of sidelink CSI-RS, sidelink CSI report and/or RSRP information on the third transmission related to TB through predefined signaling. For example, the first UE may transmit/piggyback the sidelink CSI-RS, the sidelink CSI report and/or RSRP information (e.g., L1 RSRP information) on the third transmission related to the TB based on a predefined configuration.

In step S1640, the first UE may perform a fourth transmission related to the TB to the second UE. For example, the first UE may omit transmission/piggyback of sidelink CSI-RS, sidelink CSI report and/or RSRP information (e.g., L1 RSRP information) on the fourth transmission related to TB. For example, the first terminal may be configured to perform transmission of sidelink CSI-RS, sidelink CSI report and/or RSRP information on the third transmission related to TB through predefined signaling. For example, the first UE may omit transmission/piggyback of sidelink CSI-RS, sidelink CSI report and/or RSRP information (e.g., L1 RSRP information) on the fourth transmission related to TB based on a predefined configuration.

According to an embodiment of the present disclosure, the first UE may perform transmission/piggyback of sidelink CSI-RS, sidelink CSI report and/or RSRP information on retransmission independently of operation/form of initial transmission.

Figure 17:
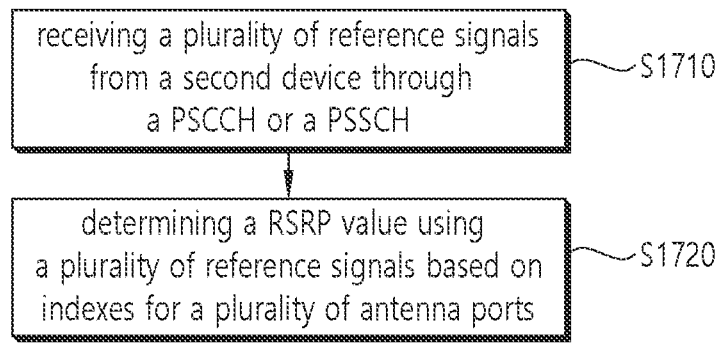
FIG. 17 shows a method for a first device to determine RSRP based on indexes for a plurality of antenna ports in accordance with an embodiment of the present disclosure.

FIG. 17 shows a method for a first device to determine RSRP based on indexes for a plurality of antenna ports in accordance with an embodiment of the present disclosure.

The embodiment of FIG. 17 may be combined with various embodiments of the present disclosure.

Referring to FIG. 17, in step S1710, the first device 100 may receive a plurality of reference signals from a second device 200 through a physical sidelink control channel (PSCCH) or a physical sidelink shared channel (PSSCH). For example, the plurality of reference signals may be transmitted through a plurality of antenna ports.

In step S1720, the first device 100 may determine a reference signal received power (RSRP) value using the plurality of reference signals based on indexes for the plurality of antenna ports. For example, the first device 100 may measure RSRP using a reference signal of each of the indexes for the plurality of antenna ports. For example, the RSRP value may be determined as the sum of the RSRP measurement values of each of the indexes for the plurality of antenna ports. For example, the RSRP value may be determined as an average value for the RSRP measurement value of each of the indexes for the plurality of antenna ports. For example, the RSRP value may be determined as the largest value among the RSRP measurement values of each of the indexes for the plurality of antenna ports. For example, the RSRP value may be determined as the smallest value among the RSRP measurement values of each of the indexes for the plurality of antenna ports.

For example, the first device 100 may measure RSRP through a reference signal of an index for a pre-configured antenna port. For example, the RSRP value may be determined as a value obtained by adding a pre-configured offset value to the RSRP measurement value. For example, the pre-configured offset value is determined based on the number of the plurality of antenna ports. For example, the pre-configured offset value is determined differently based on at least one of a service type, a priority, a service requirement, or a cast type.

For example, information related to whether at least one reference signal among the plurality of reference signals is performed frequency division multiplexing (FDM) with sidelink data is transmitted through predefined signaling. For example, information related to whether at least one reference signal among the plurality of reference signals is performed frequency division multiplexing (FDM) with sidelink data is transmitted to the first device 100 through predefined signaling. For example, based on the at least one reference signal being performed FDM with the sidelink data, the first device 100 may compensate a pre-configured value for the RSRP value. For example, based on the at least one reference signal being performed FDM with the sidelink data, the at least one reference signal may be not used for RSRP measurement.

For example, the first device 100 may transmit the RSRP value to the second device 200.

The above-described embodiment may be applied to various devices to be described below. First, for example, the processor 102 of the first device 100 may control the transceiver 106 to receive a plurality of reference signals from a second device 200 through a physical sidelink control channel (PSCCH) or a physical sidelink shared channel (PSSCH). And, for example, the processor 102 of the first device 100 may determine a reference signal received power (RSRP) value using the plurality of reference signals based on indexes for the plurality of antenna ports. And, for example, the processor 102 of the first device 100 may control the transceiver 106 to transmit the RSRP value to the second device 200.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive a plurality of reference signals from a second device through a physical sidelink control channel (PSCCH) or a physical sidelink shared channel (PSSCH), the plurality of reference signals are transmitted through a plurality of antenna ports, and determine a reference signal received power (RSRP) value using the plurality of reference signals based on indexes for the plurality of antenna ports, and transmit the RSRP value to the second device.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive a plurality of reference signals from a second UE through a physical sidelink control channel (PSCCH) or a physical sidelink shared channel (PSSCH), the plurality of reference signals are transmitted through a plurality of antenna ports, and determine a reference signal received power (RSRP) value using the plurality of reference signals based on indexes for the plurality of antenna ports, and transmit the RSRP value to the second UE.

According to an embodiment of the present disclosure, a non-transitory computer-readable storage medium storing instructions may be provided. For example, the instructions, when executed, cause a first device to: receive a plurality of reference signals from a second device through a physical sidelink control channel (PSCCH) or a physical sidelink shared channel (PSSCH), the plurality of reference signals are transmitted through a plurality of antenna ports, and determine a reference signal received power (RSRP) value using the plurality of reference signals based on indexes for the plurality of antenna ports, and transmit the RSRP value to the second device.

Figure 18:
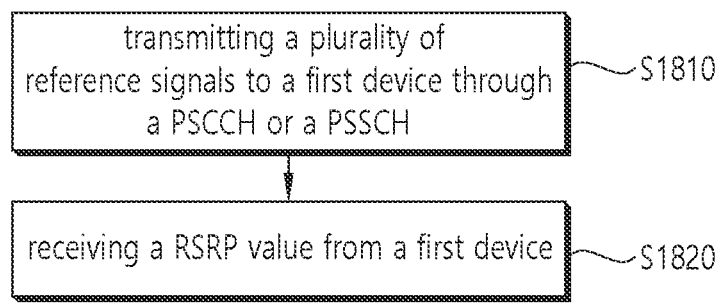
FIG. 18 shows a method for a second device to receive the RSRP value from a first device in accordance with an embodiment of the present disclosure.

FIG. 18 shows a method for a second device 200 to receive the RSRP value from a first device 100 in accordance with an embodiment of the present disclosure. The embodiment of FIG. 18 may be combined with various embodiments of the present disclosure.

Referring to FIG. 18, in step S1810, the second device 200 may transmit a plurality of reference signals to the first device 100 through a physical sidelink control channel (PSCCH) or a physical sidelink shared channel (PSSCH). For example, the plurality of reference signals may be transmitted through a plurality of antenna ports.

In step S1820, the second device 200 may receive a reference signal received power (RSRP) value from the first device 100. For example, the RSRP value may be determined through the plurality of reference signals based on indexes for the plurality of antenna ports. For example, the RSRP value may be determined as the sum of the RSRP measurement values of each of the indexes for the plurality of antenna ports. For example, the RSRP value may be determined as an average value for the RSRP measurement value of each of the indexes for the plurality of antenna ports. For example, the RSRP value may be determined as the largest value among the RSRP measurement values of each of the indexes for the plurality of antenna ports. For example, the RSRP value may be determined as the smallest value among the RSRP measurement values of each of the indexes for the plurality of antenna ports.

For example, RSRP may be measured by the first device 100 through a reference signal of an index for a pre-configured antenna port. For example, the RSRP value may be determined as a value obtained by adding a pre-configured offset value to the RSRP measurement value. For example, the pre-configured offset value is determined based on the number of the plurality of antenna ports. For example, the pre-configured offset value is determined differently based on at least one of a service type, a priority, a service requirement, or a cast type.

For example, information related to whether at least one reference signal among the plurality of reference signals is performed frequency division multiplexing (FDM) with sidelink data is transmitted through predefined signaling. For example, information related to whether at least one reference signal among the plurality of reference signals is performed frequency division multiplexing (FDM) with sidelink data is transmitted to the first device 100 through predefined signaling. For example, based on the at least one reference signal being performed FDM with the sidelink data, a pre-configured value may be compensated for the RSRP value by the first device 100. For example, based on the at least one reference signal being performed FDM with the sidelink data, the at least one reference signal may be not used for RSRP measurement.

The above-described embodiment may be applied to various devices to be described below. For example, the processor 202 of the second device 200 may control the transceiver 206 to transmit a plurality of reference signals to a first device 100 through a physical sidelink control channel (PSCCH) or a physical sidelink shared channel (PSSCH). And, the processor 202 of the second device 200 may control the transceiver 206 to receive a reference signal received power (RSRP) value from the first device 100.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: transmit a plurality of reference signals to a first device through a physical sidelink control channel (PSCCH) or a physical sidelink shared channel (PSSCH) and receive a reference signal received power (RSRP) value from the first device. For example, the plurality of reference signals are transmitted through a plurality of antenna ports. For example, the RSRP value is determined through the plurality of reference signals based on indexes for the plurality of antenna ports.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
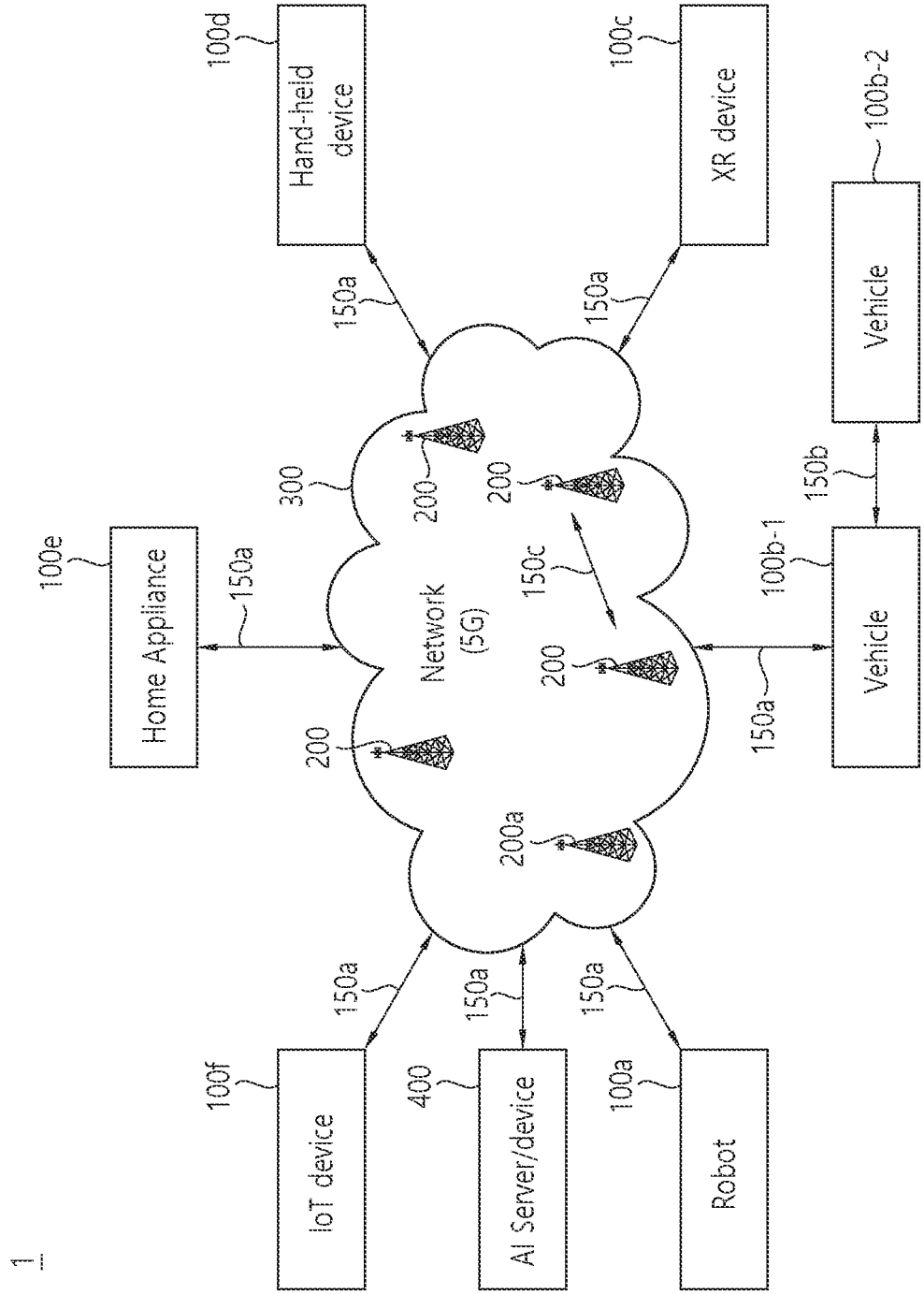
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
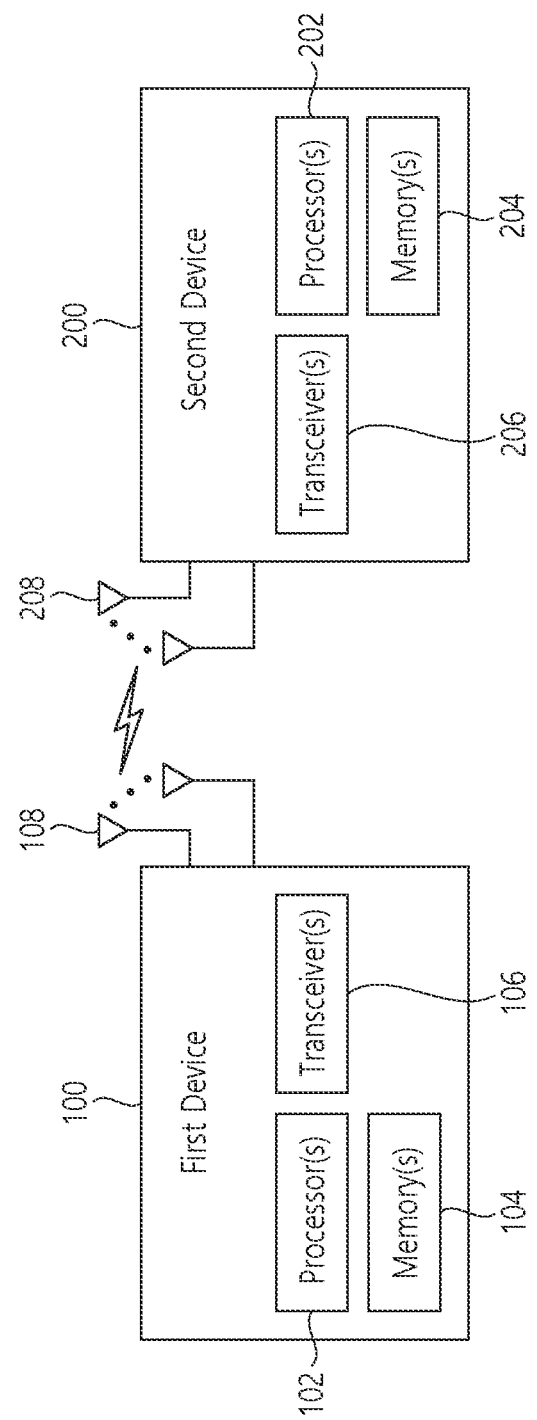
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
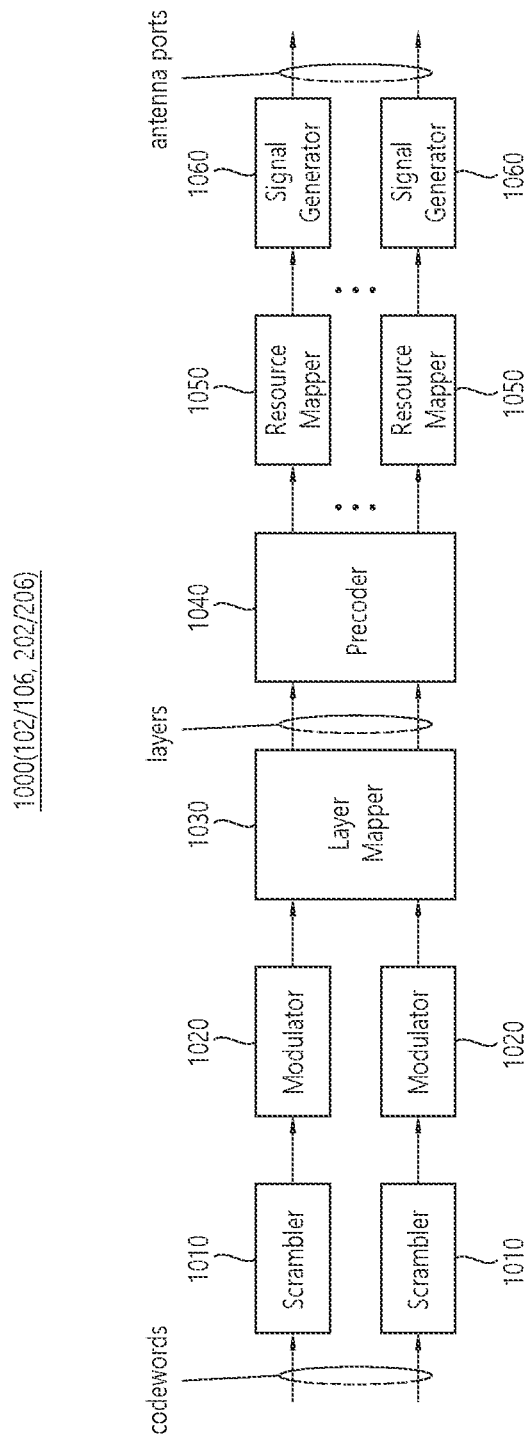
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
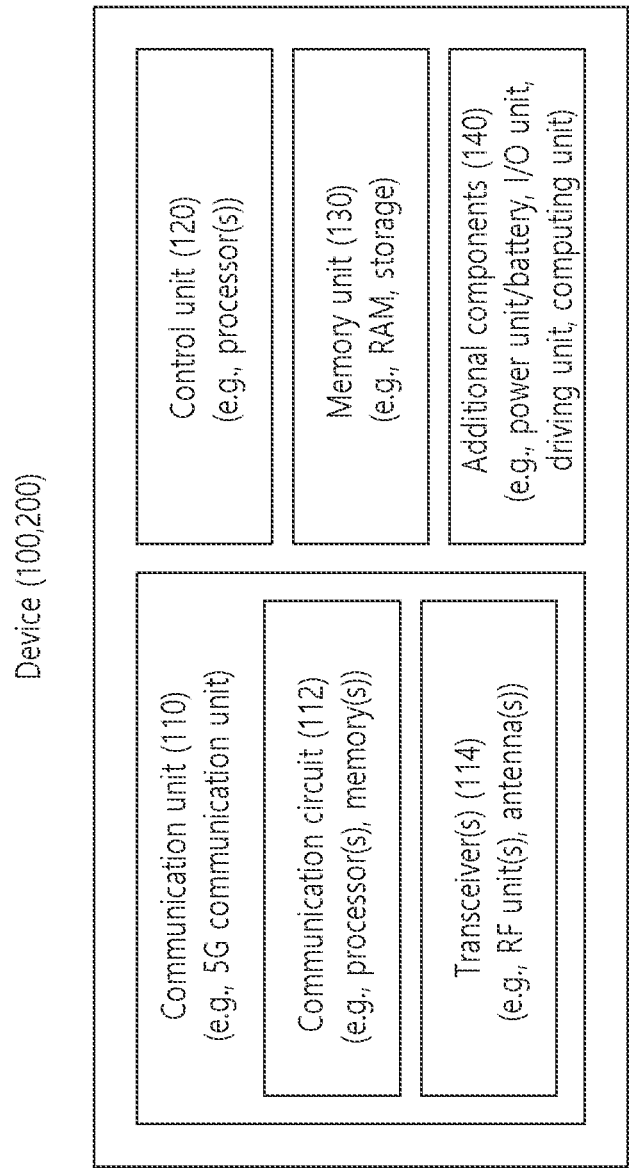
FIG. 22 shows a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
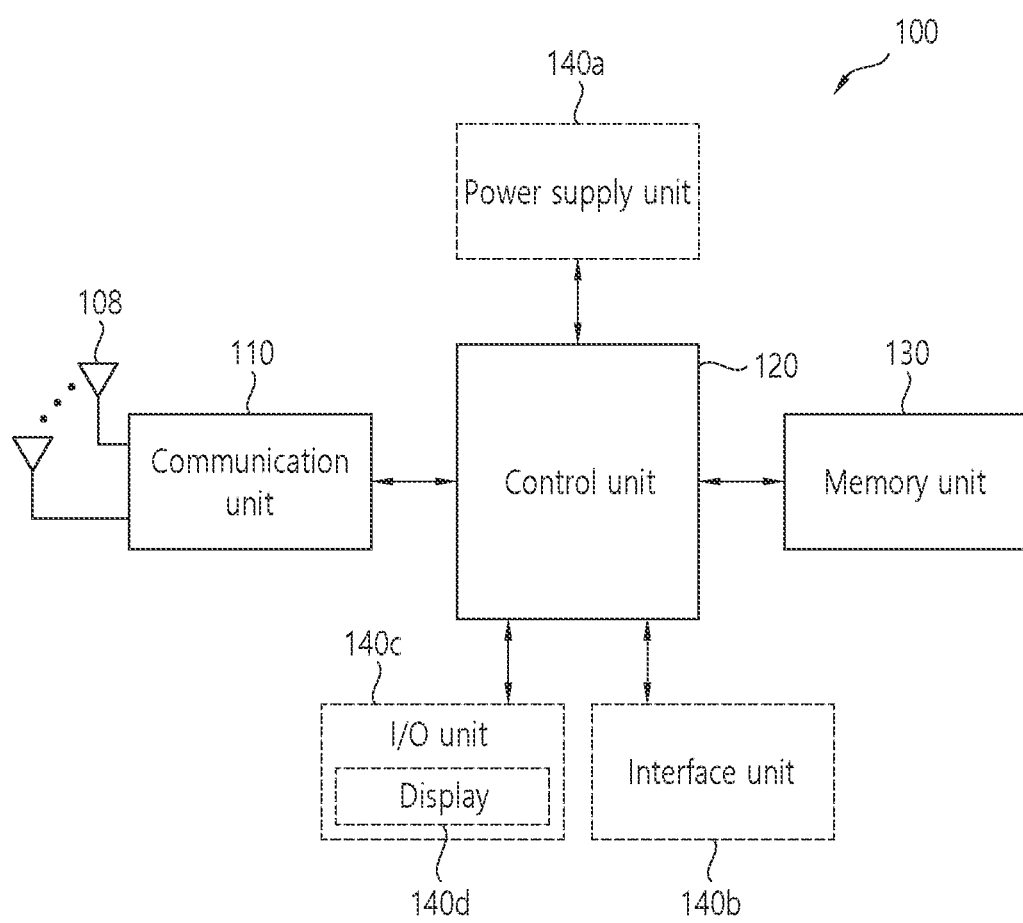
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
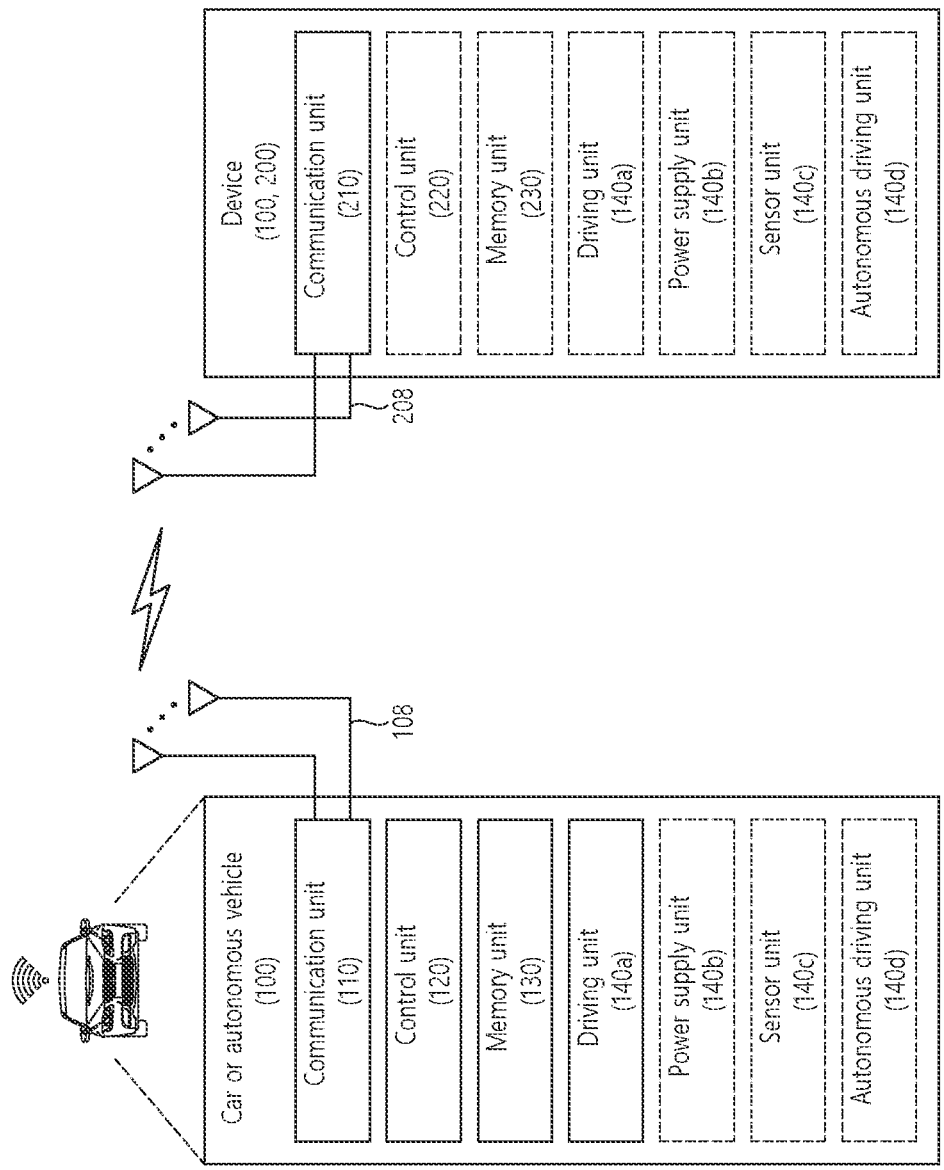
FIG. 24 shows a car or an autonomous vehicle, in accordance with an embodiment of the present disclosure.

FIG. 24 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving, from a second device through a physical sidelink control channel (PSCCH), sidelink control information (SCI) for scheduling a physical sidelink shared channel (PSSCH);
   receiving, from the second device through resource blocks for the PSSCH, a plurality of demodulation reference signals (DM-RSs),
   wherein the plurality of DM-RSs are received through a plurality of antenna ports; and
   determining a reference signal received power (RSRP) value for the PSSCH based on the plurality of DM-RSs,
   wherein the RSRP value is determined as a sum of a plurality of linear average values of power contributions of the PSSCH, wherein each of the plurality of linear average values is related to each of the plurality of antenna ports.

2. The method of claim 1, further comprising:
   transmitting the RSRP value to the second device,
   wherein the SCI includes antenna port information related to the plurality of DM-RSs for the PSSCH.

3. The method of claim 1, further comprising:
   determining a sidelink pathloss based on the RSRP value.

4. The method of claim 1, wherein the plurality of the linear average values are determined based on weights related with the plurality of antenna ports.

5. The method of claim 1, wherein information related to whether at least one DM-RS among the plurality of DM-RSs performs frequency division multiplexing (FDM) with sidelink data is transmitted via predefined signaling.

6. The method of claim 5, further comprising:
   compensating a configured value for the RSRP value based on the at least one DM-RS being performed FDM with the sidelink data.

7. The method of claim 6, wherein the configured value is determined based on a ratio of REs occupied by the at least one DM-RS among all resource elements (RE) in a symbol.

8. The method of claim 7, wherein the configured value is determined based on a ratio of power occupied by REs related to the at least one DM-RS among powers for all symbols related to the at least one DM-RS.

9. The method of claim 5, wherein at least one DM-RS is omitted from RSRP measurement, based on the at least one DM-RS being performed FDM with the sidelink data.

10. The method of claim 9, wherein boosting related to an energy per resource element (EPRE) for the PSSCH or boosting related to a power spectral density (PSD) for the PSSCH is performed.

11. The method of claim 9, further comprising:
    compensating for a value related to the at least one DM-RS for the RSRP value.

12. The method of claim 1, wherein the SCI includes information related to whether at least one DM-RS among the plurality of DM-RSs is performed frequency division multiplexing (FDM) with sidelink data.

13. The method of claim 12, wherein the SCI includes at least one of information related to an EPRE between the at least one DM-RS and sidelink data or information related to a PSD between the at least one DM-RS and sidelink data.

14. A first device for performing wireless communication, the first device comprising:
    one or more memories storing instructions;
    one or more transceivers; and
    one or more processors connected to the one or more memories and the one or more transceivers, wherein the one or more processors execute the instructions to:
    receive, from a second device through a physical sidelink control channel (PSCCH), sidelink control information (SCI) for scheduling a physical sidelink shared channel (PSSCH),
    receive, from the second device through resource blocks for the PSSCH, a plurality of demodulation reference signals (DM-RSs),
    wherein the plurality of DM-RSs are received through a plurality of antenna ports, and
    determine a reference signal received power (RSRP) value for the PSSCH based on the plurality of DM-RSs, wherein the RSRP value is determined as a sum of a plurality of linear average values of power contributions of the PSSCH, wherein each of the plurality of linear average values is related to each of the plurality of antenna ports.

15. A device configured to control a first user equipment (UE), the device comprising:
one or more processors; and
one or more memories being operably connectable to the one or more processors and storing instructions, wherein the one or more processors execute the instructions to:
receive, from a second UE through a physical sidelink control channel (PSCCH), sidelink control information (SCI) for scheduling a physical sidelink shared channel (PSSCH),
receive, from the second UE through resource blocks for the PSSCH, a plurality of demodulation reference signals (DM-RS s),
wherein the plurality of DM-RSs are received through a plurality of antenna ports, and
determine a reference signal received power (RSRP) value for the PSSCH based on the plurality of DM-RSs,
wherein the RSRP value is determined as a sum of a plurality of linear average values of power contributions of the PSSCH, wherein each of the plurality of linear average values is related to each of the plurality of antenna ports.

\* \* \* \* \*